(12) United States Patent
Raina et al.

(10) Patent No.: US 10,423,687 B2
(45) Date of Patent: Sep. 24, 2019

(54) SEARCH QUERY INTERACTIONS

(71) Applicant: Facebook, Inc., Menlo Park, CA (US)

(72) Inventors: Rajat Raina, Mountain View, CA (US); Kihyuk Hong, Seoul (KR); Sriram Sankar, Palo Alto, CA (US); Kittipat Virochsiri, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 347 days.

(21) Appl. No.: 15/627,065

(22) Filed: Jun. 19, 2017

(65) Prior Publication Data

US 2017/0286555 A1 Oct. 5, 2017

Related U.S. Application Data

(63) Continuation of application No. 15/295,818, filed on Oct. 17, 2016, now Pat. No. 9,697,291, which is a continuation of application No. 14/983,245, filed on Dec. 29, 2015, now Pat. No. 9,471,692, which is a continuation of application No. 13/887,049, filed on May 3, 2013, now Pat. No. 9,367,625.

(51) Int. Cl.
*G06F 16/245* (2019.01)
*G06F 16/9535* (2019.01)
*G06F 16/2455* (2019.01)
*G06F 16/2457* (2019.01)

(52) U.S. Cl.
CPC ........ *G06F 16/9535* (2019.01); *G06F 16/245* (2019.01); *G06F 16/24565* (2019.01); *G06F 16/24578* (2019.01)

(58) Field of Classification Search
CPC .................................................. G06F 16/24565
See application file for complete search history.

(56) References Cited

U.S. PATENT DOCUMENTS 7,752,326 B2 7/2010 Smit
7,836,044 B2 11/2010 Kamvar
(Continued)

FOREIGN PATENT DOCUMENTS

CA 2932334 11/2014
CN 1497474 5/2004
(Continued)

OTHER PUBLICATIONS

U.S. Appl. No. 15/627,150, filed Jun. 19, 2017, Raina.
(Continued)

*Primary Examiner* — Kris E Mackes
(74) *Attorney, Agent, or Firm* — Baker Botts L.L.P.

(57) ABSTRACT

In one embodiment, a method includes receiving a query comprising one or more n-grams, generating a plurality of query commands based on a parsing of the query input, wherein each query command comprises an inner query constraint and an outer query constraint, scoring the query commands based at least in part on a number of objects matching the inner query constraint of the respective query command, selecting a first query command based at least in part on the respective scores of the query commands, and executing the first query command to identify a plurality of objects based on: (1) a first set of objects matching the first inner query constraint and at least in part matching the first outer query constraint, and (2) a second set of objects matching the first outer query constraint.

20 Claims, 12 Drawing Sheets

(56) References Cited

U.S. PATENT DOCUMENTS

| | | |
|---|---|---|
| 8,027,990 B1 | 9/2011 | Mysen |
| 8,060,639 B2 | 11/2011 | Smit |
| 8,112,529 B2 | 2/2012 | Smit |
| 8,135,721 B2 | 3/2012 | Joshi |
| 8,185,558 B1 | 5/2012 | Narayanan |
| 8,239,364 B2 | 8/2012 | Wable |
| 8,271,471 B1 | 9/2012 | Kamvar |
| 8,271,546 B2 | 9/2012 | Gibbs |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,595,297 B2 | 11/2013 | Marcucci |
| 8,601,027 B2 | 12/2013 | Behforooz |
| 8,935,271 B2 | 1/2015 | Lassen |
| 8,983,991 B2 | 3/2015 | Sankar |
| 9,158,801 B2 | 10/2015 | Lassen |
| 9,367,536 B2 | 6/2016 | Raina |
| 9,367,625 B2 | 6/2016 | Raina |
| 9,367,880 B2 | 6/2016 | Raina |
| 9,471,692 B2 | 10/2016 | Raina |
| 2002/0059199 A1 | 5/2002 | Harvey |
| 2003/0225761 A1 | 12/2003 | Wagener |
| 2005/0131872 A1 | 6/2005 | Calbucci |
| 2007/0277100 A1 | 11/2007 | Sheha |
| 2008/0016033 A1 | 1/2008 | Forstmann |
| 2008/0114730 A1 | 5/2008 | Larimore |
| 2008/0147628 A1 | 6/2008 | Dettinger |
| 2009/0006543 A1 | 1/2009 | Smit |
| 2009/0171929 A1 | 7/2009 | Jing |
| 2009/0228296 A1 | 9/2009 | Ismalon |
| 2009/0259624 A1 | 10/2009 | DeMaris |
| 2009/0281988 A1 | 11/2009 | Yoo |
| 2010/0049702 A1 | 2/2010 | Martinez |
| 2010/0082604 A1 | 4/2010 | Gutt |
| 2010/0235354 A1 | 9/2010 | Gargaro |
| 2010/0306271 A1 | 12/2010 | Shmueli |
| 2011/0035397 A1 | 2/2011 | Joshi |
| 2011/0078166 A1 | 3/2011 | Oliver |
| 2011/0087534 A1 | 4/2011 | Strebinger |
| 2011/0137902 A1 | 6/2011 | Wable |
| 2011/0196855 A1 | 8/2011 | Wable |
| 2011/0295838 A1 | 12/2011 | Collins |
| 2012/0059713 A1 | 3/2012 | Galas |
| 2012/0131032 A1 | 5/2012 | Raksuit |
| 2012/0150850 A1 | 6/2012 | Parthasarathy |
| 2012/0271831 A1 | 10/2012 | Narayanan |
| 2012/0278127 A1 | 11/2012 | Kirakosyan |
| 2012/0284329 A1 | 11/2012 | van den Oord |
| 2012/0290562 A1 | 11/2012 | Wable |
| 2012/0311034 A1 | 12/2012 | Goldband |
| 2013/0031106 A1 | 1/2013 | Schechter |
| 2013/0036109 A1 | 2/2013 | Kulick |
| 2013/0041876 A1 | 2/2013 | Dow |
| 2013/0060761 A1 | 3/2013 | Hoad |
| 2013/0066876 A1 | 3/2013 | Raskino |
| 2013/0085970 A1 | 4/2013 | Karnik |
| 2013/0086057 A1 | 4/2013 | Harrington |
| 2016/0132507 A1 | 5/2016 | Raina |
| 2016/0132597 A1 | 5/2016 | Raina |
| 2017/0031979 A1 | 2/2017 | Raina |
| 2017/0032047 A1 | 2/2017 | Raina |
| 2017/0039197 A1 | 2/2017 | Raina |

FOREIGN PATENT DOCUMENTS

| | | |
|---|---|---|
| JP | 61-220027 A | 9/1986 |
| JP | 3-15981 A | 1/1991 |
| JP | 5-128157 A | 5/1993 |
| JP | 7-44573 A | 2/1995 |
| JP | 2000-187663 A | 7/2000 |
| JP | 2010-218376 A | 9/2010 |
| JP | 2011085992 A | 4/2011 |
| JP | 2011-170471 A | 9/2011 |
| JP | 2012-038023 A | 2/2012 |
| JP | 2013-242675 A | 12/2013 |
| JP | 2014-194772 A | 10/2014 |
| JP | 2014-534516 A | 12/2014 |
| KR | 10-2011-0086233 A | 7/2011 |
| KR | 10-1073602 B1 | 10/2011 |
| WO | WO 2004/097679 A1 | 11/2004 |
| WO | WO 2008/137590 A2 | 11/2008 |
| WO | WO 2012/150316 A1 | 11/2012 |

OTHER PUBLICATIONS

Int'l Search Report for PCT/US2014/036092, dated Jan. 7, 2016.
Int'l Search Report for PCT/US2014/036105, dated Jul. 24, 2014.
Int'l Search Report for PCT/US2014/036109, dated Aug. 18, 2014.
Binnig, et al., "Reverse Query Processing," IEEE 23rd International Conference on Data Engineering, 2007, Istanbul, pp. 506-515 and Figure 1, Apr. 15-20, 2007.
Australian Government Patent Examination Report No. 2 for Patent Application No. 2014259926, dated Jan. 29, 2016.
Korean Intellectual Property Office, Notice of Preliminary Rejection for Application No. 10-2015-7034381 (with translation), dated Mar. 7, 2016.
Canadian Intellectual Property Office, Notice of Requisition by Examiner in order to avoid abandonment for Application No. 2,918,208, dated Mar. 3, 2016.
State of Israel Patent Authority, Notification of defects in Israeli Patent Application No. 242365, dated Apr. 4, 2016.
Notification of Reasons for Rejection of Japanese Patent Application No. 2016-170773 (with translation), dated Nov. 28, 2016.
People's Republic of China Intellectual Property Office Notification of the Second Office Action for Patent No. 2016-120201342970 (with translation), dated Dec. 7, 2016.
European Patent Office Extended Search Report for Application No./Patent No. 14791401.4-1910/2992464, PCT/US2014036109, dated Dec. 12, 2016.
Sriram Sankar, "Under the Hood: Indexing and ranking in Graph Search," Retrieved from the Internet: URL:https://facebook.com/notes/facebook-engineering/under-the-hood-indexing-and-ranking-in-graph-search/10151361720763929/ [retrieved on Nov. 25, 2016], dated Mar. 14, 2013.
Korean Intellectual Property Office, Notice of Preliminary Rejection of Application No. 10-2016-7020606 (with translation), dated Aug. 11, 2017.
Canadian Intellectual Property Office, Notice of Requisition by Examiner in order to avoid abandonment of Application No. 2,966,826, dated Jul. 12, 2017.
IP Australia Examination report No. 1 for standard patent application for Patent Application No. 2017202634, dated Jun. 12, 2017.
Broder, A. Z. et al: "Efficient Query Evaluation using a Two-Level Retrieval Process", CIKM '03, Proceedings of the 12th International Conference on Information and Knowledge Management, New Orleans, Louisiana, USA, pp. 426-434, Nov. 3-8, 2003.
AU Office Action received for Patent Application No. 2017204809, dated Jul. 19, 2018.
Decision of Rejection for JP Patent Application No. 2017-154017 (with English translation), dated Apr. 2, 2019.
AU Office Action received for Patent Application No. 2017221856, dated Jun. 25, 2018.
Examination Report No. 1 for AU Application No. 2016262774, dated Apr. 6, 2018.
Extended European Search Report for Application No. 17180517.9-1914, dated Sep. 27, 2017.
JP OA received from JPO for Patent Application No. 2016-216106 (with English Translation), dated Aug. 7, 2018.
Notification of the first Office Action for CN Application No. 2017104764395 (with English translation), dated May 3, 2018.
Notice of Acceptance for AU Application No. 2016262774, dated May 25, 2018.
CN Office Action received for Patent Application No. 2017104764395. (with English Translation), dated Feb. 3, 2019.

(56) References Cited

OTHER PUBLICATIONS

Examination Report No. 1 for AU Application No. 201704809, dated Apr. 13, 2018.
Canadian Intellectual Property Office Notice of Requisition by the Examiner in Order to Avoid Abandonment of Application No. 2,919,447, dated Aug. 3, 2017.
JP OA received from JPO for Patent Application No. 2017-154017. (with English Translation), dated Oct. 9, 2018.

SEARCH QUERY INTERACTIONS

PRIORITY

This application is a continuation under 35 U.S.C. § 120 of U.S. patent application Ser. No. 15/295,818, filed 17 Oct. 2016, which is a continuation under 35 U.S.C. § 120 of U.S. patent application Ser. No. 14/983,245, filed 29 Dec. 2015, issued as U.S. Pat. No. 9,471,692 on 18 Oct. 2016, which is a continuation under 35 U.S.C. § 120 of U.S. patent application Ser. No. 13/887,049, filed 3 May 2013, issued as U.S. Pat. No. 9,367,625 on 14 Jun. 2016.

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a user of a social-networking system may search for objects associated with the system using a structured queries that include references to particular social-graph elements. Structured queries may provide a powerful way for users of an online social network to search for objects represented in a social graph based on their social-graph attributes and their relation to various social-graph elements.

In particular embodiments, in response to a structured query having both an inner constraint and an outer constraint, such as a nested search query, the social-networking system may identify objects associated with the online social network that satisfy both the inner and outer constraints. The process of searching verticals of objects associated with the social-networking system may be improved by using query hinting, where the outer query constraint is used when identifying objects that match the inner query constraint. For example, a relatively complex structured query, such as "Photos of females taken in Palo Alto", could be parsed so that a user vertical is searched to identify users who are female, and by using an operator that allows arguments to be absents from some results, such as a "weak and" (WAND) operator, to identify at least some female user who also are tagged in photos in Palo Alto. Next, a photos vertical could be searched to identify photos taken in Palo Alto where any of the identified female users are tagged. In particular embodiments, the results from the first vertical could be scored and ranked, and those scores could be used when scoring the results of the second vertical. In this way, the search of the vertical corresponding to objects requested by the outer constraint is more likely to generate results that satisfy the search query. This may also allow the social-networking system to produce better search results and may improve the processing efficiency for generating these results.

In particular embodiments, the social-networking system may parse structured search queries and generate query commands that include inverse operators. The process of searching verticals of objects associated with the social-networking system may be improved by using inverse operators, where one of the query constraints may be modified to include its inverse constraint. When parsing a structured query having both an inner query constraint and an outer query constraint, such as a nested search query, the typical processing of the query may produce an inadequate number of search results. This may happen, for example, because the inner query constraint produces too many results, reducing the likelihood that any of them will intersect the outer query. The process of searching verticals of objects associated with the social-networking system may be improved by using an inverse operator, where the inverse constraint is used instead of the original query constraint when searching the vertical for matching objects. For example, a relatively complex structured query, such as "Photos of me liked by people in China", could be parsed so that instead of using a "liked_by" operator to search for photos liked by users in China, to instead user a "likers_of" operator to search for users of photos of the querying user. In this way, an inverse operator may be used so that the search of a particular vertical produces better search results, and may improve the processing efficiency for generating these results.

In particular embodiments, the social-networking system may rank search results based on the search intent of the querying user. Users may have different intents when running different search queries. The search algorithm used to generate search results may be modified based on these search intents, such that the way search results are ranked in response to one query may be different from the way search results are ranked in response to another query. The social-networking system may identify one or more search intents for the search query, and then rank the search results matching the search query based on the search intents. Search intent may be determined in a variety of ways, such as, for example, based on social-graph elements referenced in the search query, terms within the search query, user information associate with the querying user, search history of the querying user, pattern detection, other suitable information related to the query or the user, or any combination thereof. For example, a particular social-graph element referenced in a search query may correspond to a particular search intent. By using search intent when ranking search results, the social-networking system may be able to more effectively present search result are more relevant or of more interest to the querying user.

DESCRIPTION OF EXAMPLE EMBODIMENTS

System Overview

Figure 1:
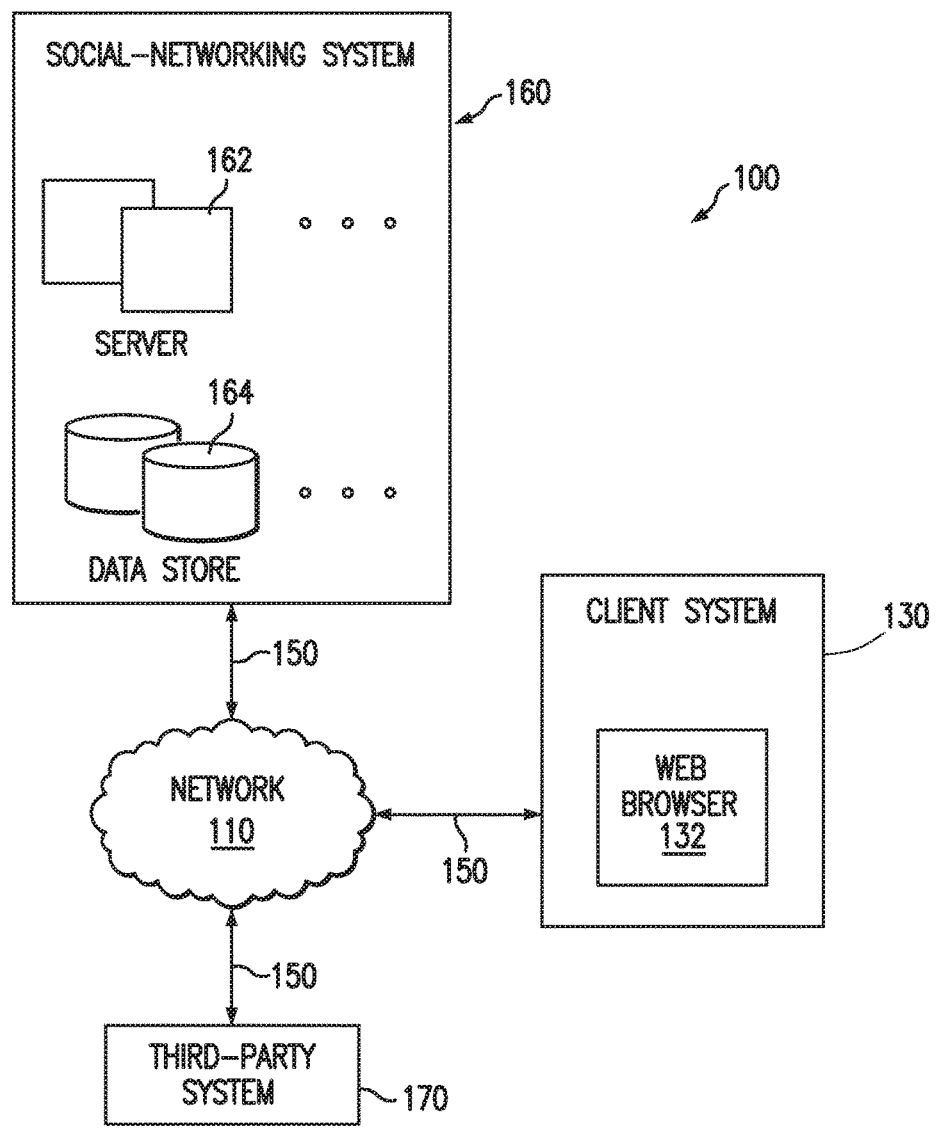
FIG. 1 illustrates an example network environment associated with a social-networking system.

FIG. 1 illustrates an example network environment 100 associated with a social-networking system. Network environment 100 includes client system 130, social-networking system 160, and third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. Client system 130 may enable a network user at client system 130 to access network 110. Client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable client system 130, social-networking system 160, or third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, third-party system 170 may include a third-party content object provider. A third-party content object provider may include one or more sources of content objects, which may be communicated to client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to client system 130. Information may be pushed to client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
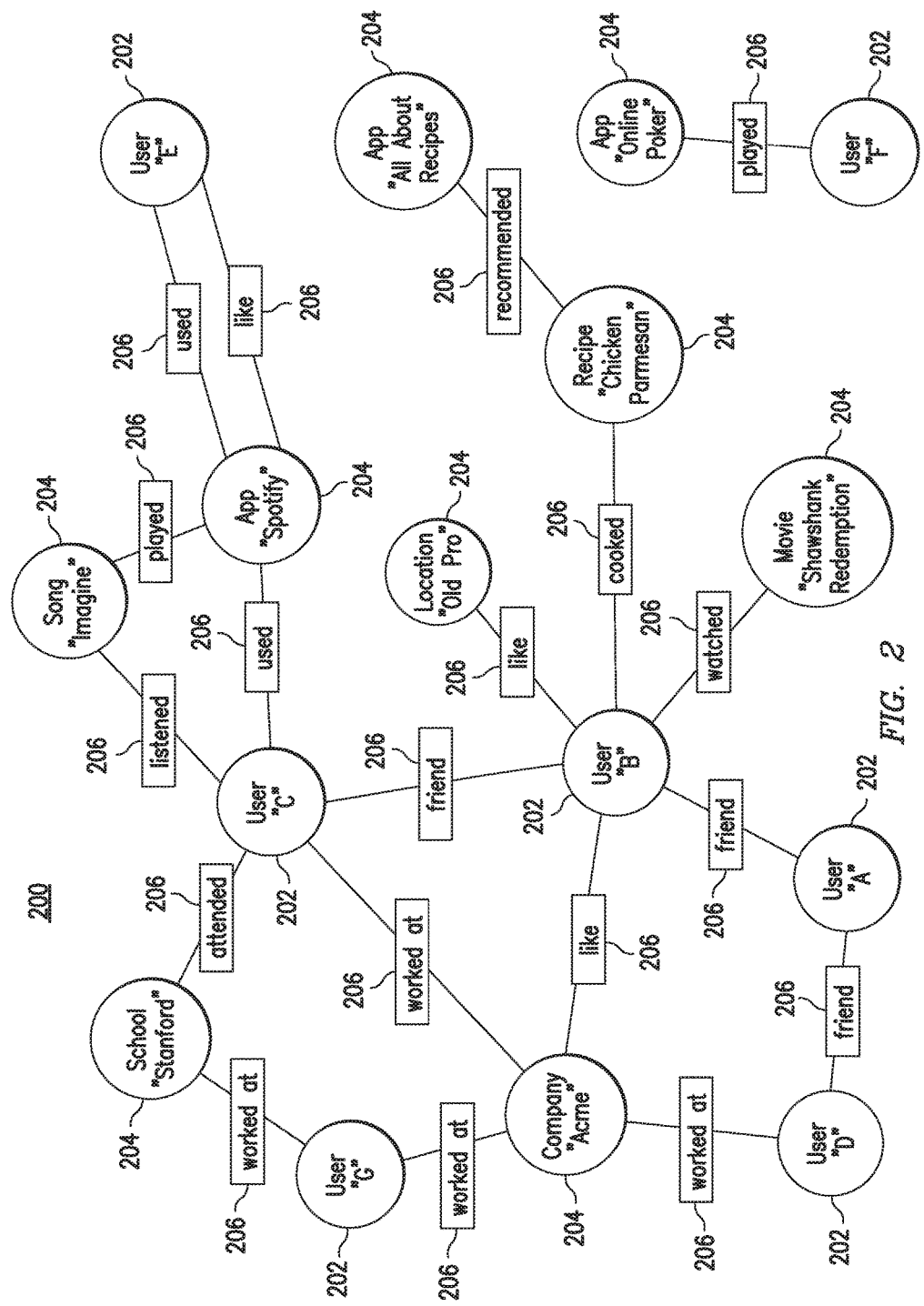
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204.

In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Indexing Based on Object-Type

Figure 3:
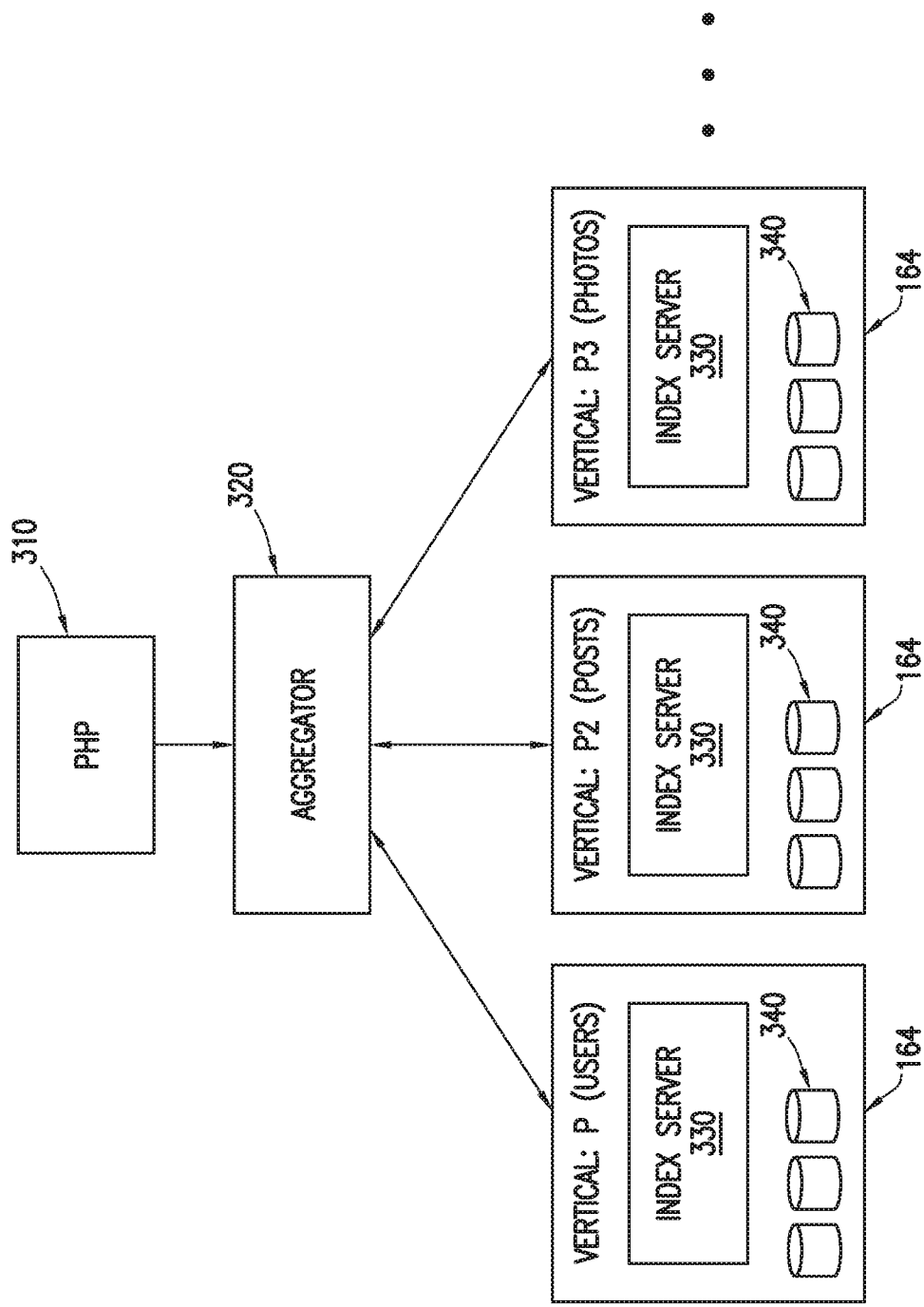
FIG. 3 illustrates an example partitioning for storing objects of a social-networking system.

FIG. 3 illustrates an example partitioning for storing objects of social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned by based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a webpage, an application, a user-profile page, a concept-profile page, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a structured query submitted to the PHP process by a user or another process of social-networking system 160 (or third-party system 170).

More information on indexes and search queries may be found in U.S. patent application Ser. No. 13/560,212, filed 27 Jul. 2012, U.S. patent application Ser. No. 13/560,901, filed 27 Jul. 2012, and U.S. patent application Ser. No. 13/723,861, filed 21 Dec. 2012, each of which is incorporated by reference.

Typeahead Processes

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested webpage (such as, for example, a user-profile page, a concept-profile page, a search-results webpage, or another suitable page of the online social network), which may be hosted by or accessible in social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more frontend (client-side) and/or backend (server-side) typeahead processes (hereinafter referred to simply as "typeahead process") executing at (or within) social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, social-networking system 160 can also provides user's with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the frontend-typeahead process may send the entered character string as a request (or call) to the backend-typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also send before, after, or with the request a section identifier (section ID) that identifies the particular section of the particular page in which the user is making the declaration. In particular embodiments, a user ID parameter may also be sent, but this may be unnecessary in some embodiments, as the user may already be "known" based on the user having logged into (or otherwise been authenticated by) social-networking system 160.

In particular embodiments, the typeahead process may use one or more matching algorithms to attempt to identify matching social-graph elements. In particular embodiments, when a match or matches are found, the typeahead process may send a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, each of which is incorporated by reference.

Structured Search Queries

Figure 4:
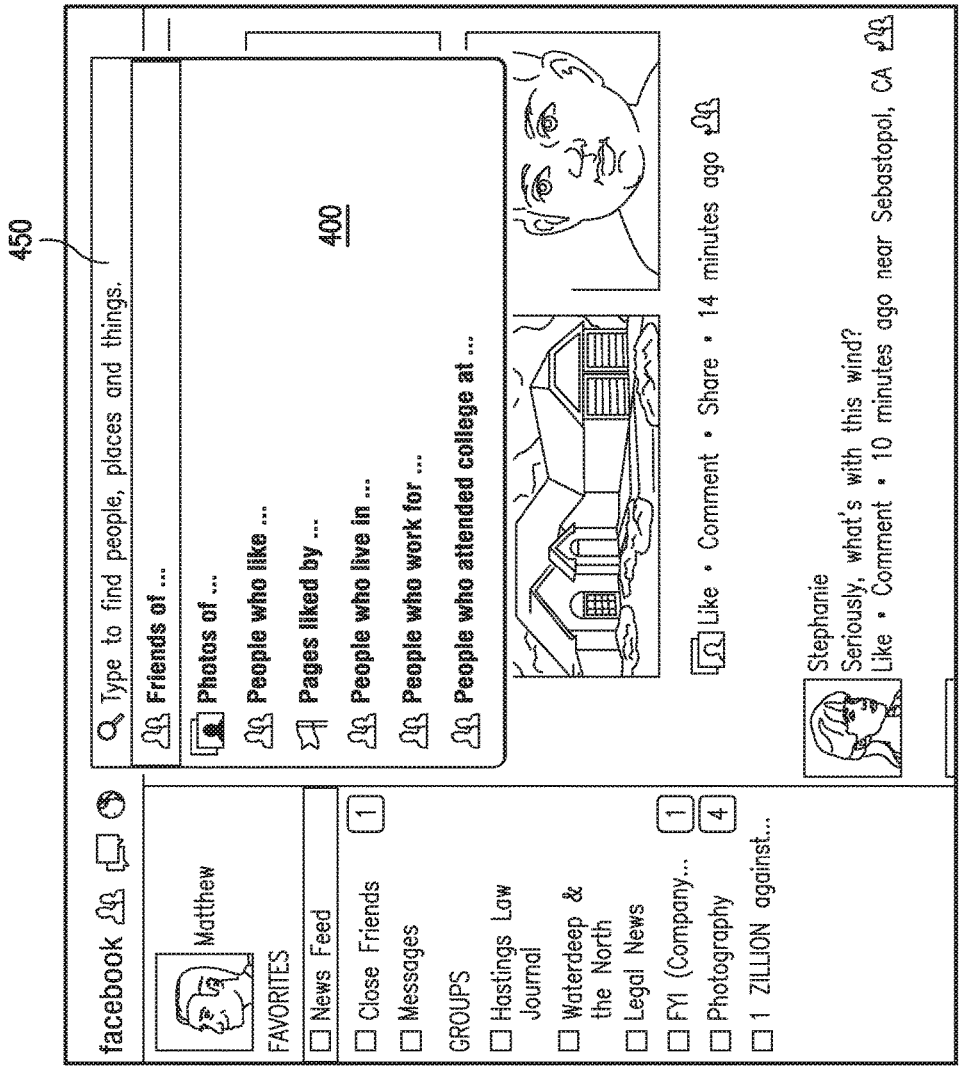
FIG. 4 illustrates an example webpage of an online social network.

FIG. 4 illustrates an example webpage of an online social network. In particular embodiments, a user may submit a query to the social-network system 160 by inputting text into query field 450. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into query field 450 to search for content on social-networking system 160 that matches the text query. Social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. Social-networking system 160 may then generate a search-results webpage with search results corresponding to the identified content and send the search-results webpage to the user. In particular embodiments, the search engine may limit its search to resources and content on the online social network. However, in particular embodiments, the search engine may also search for resources or contents on other sources, such as third-party system 170, the internet or World Wide Web, or other suitable sources. Although this disclosure describes querying social-networking system 160 in a particular manner, this disclosure contemplates querying social-networking system 160 in any suitable manner.

In particular embodiments, the typeahead processes described herein may be applied to search queries entered by a user. As an example and not by way of limitation, as a user enters text characters into a query filed 450, a typeahead process may attempt to identify one or more user nodes 202, concept nodes 204, or edges 206 that match the string of characters entered into the query filed 450 as the user is entering the characters. As the typeahead process receives requests or calls including a string or n-gram from the text query, the typeahead process may perform or causes to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu 400 that displays references to the matching profile pages (e.g., a name or photo associated with the page) of the respective user nodes 202 or concept nodes 204, and displays names of matching edges 206 that may connect to the matching user nodes 202 or concept nodes 204, which the user can then click on or otherwise select, thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu 400. The user may then confirm the auto-populated declaration simply by keying "enter" on a keyboard or by clicking on the auto-populated declaration. Upon user confirmation of the matching nodes and/or edges, the typeahead process may send a request that informs social-networking system 160 of the user's confirmation of a query containing the matching social-graph elements. In response to the sent request, social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503, 093, filed 11 Aug. 2006, U.S. patent application Ser. No. 12/977,027, filed 22 Dec. 2010, and U.S. patent application Ser. No. 12/978,265, filed 23 Dec. 2010, each of which is incorporated by reference.

Element Detection and Parsing Search Queries

FIGS. 5A-5D illustrate example queries of the online social network. In particular embodiments, in response to a text query received from a first user (i.e., the querying user), social-networking system 160 may parse the text query and identify portions of the text query that correspond to particular social-graph elements. Social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. These structured queries may be presented to the querying user, who can then select among the structured queries to indicate that the selected structured query should be run by social-networking system 160. FIGS. 5A-5D illustrate various example text queries in query field 450 and various structured queries generated in response in drop-down menus 400 (although other suitable graphical user interfaces are possible). By providing suggested structured queries in response to a user's text query, social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu 400 (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes and FIGS. 5A-5D illustrate generating particular structured queries in a particular manner, this disclosure contemplates generating any suitable structured queries in any suitable manner.

Figure 5A:
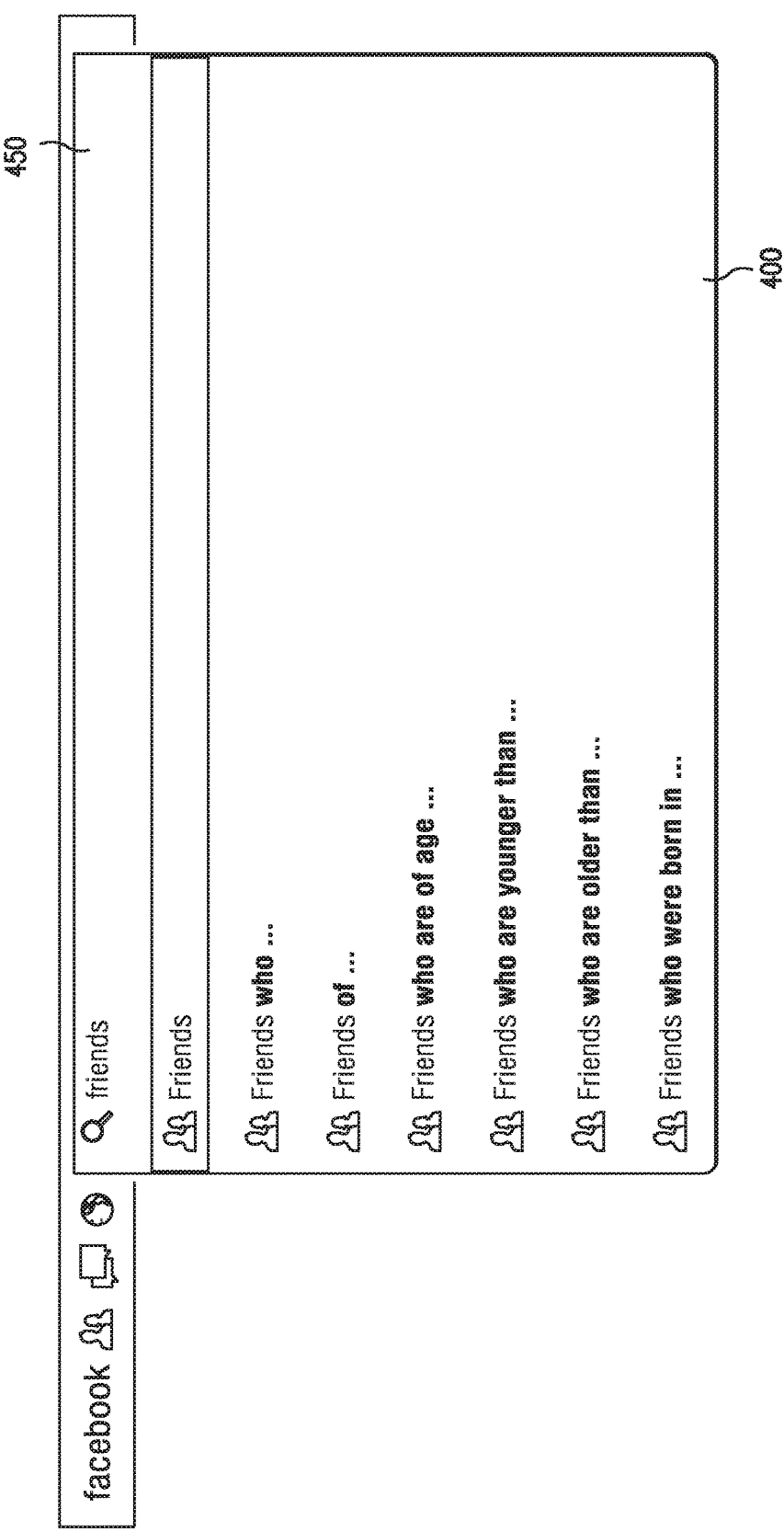
FIGS. 5A-5D illustrate example queries of the social network.
Figure 5B:
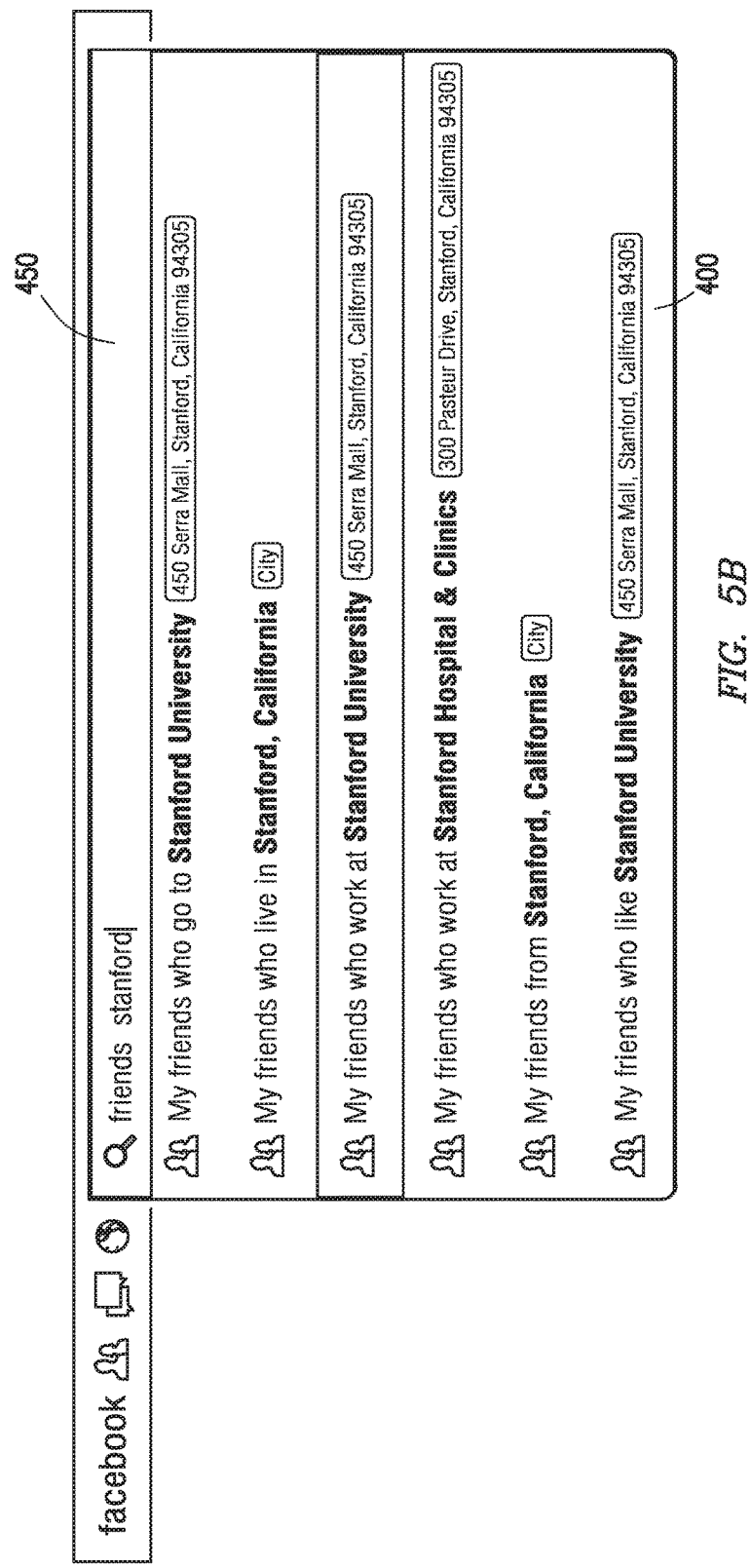

In particular embodiments, social-networking system 160 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into query field 450, as illustrated in FIGS. 5A-5B. As the querying user enters this text query into query field 450, social-networking system 160 may provide various suggested structured queries, as illustrated in drop-down menus 400. As used herein, an unstructured text query refers to a simple text string inputted by a user. The text query may, of course, be structured with respect to standard language/grammar rules (e.g. English language grammar). However, the text query will ordinarily be unstructured with respect to social-graph elements. In other words, a simple text query will not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query will not necessarily be in the format of a query command that is directly executable by a search engine (e.g., the text query "friends stanford" could be parsed to form the query command "intersect(school (Stanford University), friends(me)", which could be executed as a query in a social-graph database). Although this disclosure describes receiving particular queries in a particular manner, this disclosure contemplates receiving any suitable queries in any suitable manner.

In particular embodiments, social-networking system 160 may parse the unstructured text query (also simply referred to as a search query) received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. An n-gram of size one can be referred to as a "unigram," of size two can be referred to as a "bigram" or "digram," of size three can be referred to as a "trigram," and so on. Each n-gram may include one or more parts from the text query received from the querying user. In particular embodiments, each n-gram may comprise a character string (e.g., one or more characters of text) entered by the first user. As an example and not by way of limitation, social-networking system 160 may parse the text query "friends stanford" to identify the following n-grams: friends; stanford; friends stanford. As another example and not by way of limitation, social-networking system 160 may parse the text query "friends in palo alto" to identify the following n-grams: friends; in; palo; alto; friends in; in palo; palo alto; friend in palo; in palo also; friends in palo alto. In particular embodiments, each n-gram may comprise a contiguous sequence of n items from the text query. Although this disclosure describes parsing particular queries in a particular manner, this disclosure contemplates parsing any suitable queries in any suitable manner.

In connection with element detection and parsing search queries, particular embodiments may utilize one or more systems, components, elements, functions, methods, operations, or steps disclosed in U.S. patent application Ser. No. 13/556,072, filed 23 Jul. 2012, U.S. patent application Ser. No. 13/732,101, filed 31 Dec. 2012, each of which is incorporated by reference.

Generating Structured Search Queries

In particular embodiments, social-networking system 160 may access a context-free grammar model comprising a plurality of grammars. Each grammar of the grammar model may comprise one or more non-terminal tokens (or "non-terminal symbols") and one or more terminal tokens (or "terminal symbols"/"query tokens"), where particular non-terminal tokens may be replaced by terminal tokens. A grammar model is a set of formation rules for strings in a formal language. Although this disclosure describes accessing particular grammars, this disclosure contemplates any suitable grammars.

In particular embodiments, social-networking system 160 may generate one or more strings using one or more grammars. To generate a string in the language, one begins with a string consisting of only a single start symbol. The production rules are then applied in any order, until a string that contains neither the start symbol nor designated non-terminal symbols is produced. In a context-free grammar, the production of each non-terminal symbol of the grammar is independent of what is produced by other non-terminal symbols of the grammar. The non-terminal symbols may be replaced with terminal symbols (i.e., terminal tokens or query tokens). Some of the query tokens may correspond to identified nodes or identified edges, as described previously. A string generated by the grammar may then be used as the basis for a structured query containing references to the identified nodes or identified edges. The string generated by the grammar may be rendered in a natural-language syntax, such that a structured query based on the string is also rendered in natural language. A context-free grammar is a grammar in which the left-hand side of each production rule consists of only a single non-terminal symbol. A probabilistic context-free grammar is a tuple $<\Sigma, N, S, P>$, where the disjoint sets $\Sigma$ and $N$ specify the terminal and non-terminal symbols, respectively, with $\in N$ being the start symbol. P is the set of productions, which take the form $E \rightarrow \xi(p)$, with $E \in N$, $\xi \in (\Sigma \cup N)^+$, and $p = Pr(E \rightarrow \xi)$, the probability that E will be expanded into the string $\xi$. The sum of probabilities p over all expansions of a given non-terminal E must be one. Although this disclosure describes generating strings in a particular manner, this disclosure contemplates generating strings in any suitable manner.

In particular embodiments, social-networking system 160 may generate one or more structured queries. The structured queries may be based on the natural-language strings generated by one or more grammars, as described previously. Each structured query may include references to one or more of the identified nodes or one or more of the identified edges 206. This type of structured query may allow social-networking system 160 to more efficiently search for resources and content related to the online social network (such as, for example, profile pages) by searching for content connected to or otherwise related to the identified user nodes 202 and the identified edges 206. As an example and not by way of limitation, in response to the text query, "show me friends of my girlfriend," social-networking system 160 may generate a structured query "Friends of Stephanie," where "Friends" and "Stephanie" in the structured query are references corresponding to particular social-graph elements. The reference to "Stephanie" would correspond to a particular user node 202 (where social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, social-networking system 160 may identify one or more user nodes 202 connected by friend-type edges 206 to the user node 202 corresponding to "Stephanie". As another example and not by way of limitation, in response to the text query, "friends who like facebook," social-networking system 160 may generate a structured query "Friends who like Facebook," where "Friends," "like," and "Facebook" in the structured query are references corresponding to particular social-graph elements as described previously (i.e., a friend-type edge 206, a like-type edge 206, and concept node 204 corresponding to the company "Facebook"). Although this disclosure describes generating particular structured queries in a particular manner, this disclosure contemplates generating any suitable structured queries in any suitable manner.

In particular embodiments, social-networking system 160 may rank the generated structured queries. The structured queries may be ranked based on a variety of factors, such as, for example, in order of the probability or likelihood that the identified nodes/edges referenced in those structured queries match the search intent of the querying user, as determined by social-networking system 160. After ranking the structured queries, social-networking system 160 may then send only those structured queries having a rank greater than a threshold rank (e.g., the top seven ranked queries may be sent to the querying user and displayed in a drop-down menu 300). In particular embodiments, the rank for a structured query may be based on the degree of separation between the user node 202 of the querying user and the particular social-graph elements referenced in the structured query. Structured queries that reference social-graph elements that are closer in the social graph 200 to the querying user (i.e., fewer degrees of separation between the element and the querying user's user node 202) may be ranked more highly than structured queries that reference social-graph elements that are further from the user (i.e., more degrees of separation). In particular embodiments, social-networking system 160 may rank the structured queries based on a search history associated with the querying user. Structured queries that reference social-graph elements that the querying user has previously accessed, or are relevant to the social-graph elements the querying user has previously accessed, may be more likely to be the target of the querying user's search query. Thus, these structured queries may be ranked more highly. As an example and not by way of limitation, if querying user has previously visited the "Stanford University" profile page but has never visited the "Stanford, Calif." profile page, when determining the rank for structured queries referencing these concepts, social-networking system 160 may determine that the structured query referencing the concept node 204 for "Stanford University" has a relatively high rank because the querying user has previously accessed the concept node 204 for the school. In particular embodiments, a structured query may include a snippet of contextual information about one or more of the social-graph elements referenced in the structured query. In particular embodiments, social-networking system 160 may rank the structured queries based on advertising sponsorship. An advertiser (such as, for example, the user or administrator of a particular profile page corresponding to a particular node) may sponsor a particular node such that a structured query referencing that node may be ranked more highly. Although this disclosure describes ranking structured queries in a particular manner, this disclosure contemplates ranking structured queries in any suitable manner.

In particular embodiments, social-networking system 160 may receive from the querying user a selection of one of the structured queries. The nodes and edges referenced in the received structured query may be referred to as the selected nodes and selected edges, respectively. As an example and not by way of limitation, the web browser 132 on the querying user's client system 130 may display the sent structured queries in a drop-down menu 300, as illustrated in FIGS. 5A-5D, which the user may then click on or otherwise select (e.g., by simply keying "enter" on his keyboard) to indicate the particular structured query the user wants social-networking system 160 to execute. Upon selecting a particular structured query, the user's client system 130 may call or otherwise instruct to social-networking system 160 to execute the selected structured query. Although this disclosure describes receiving selections of particular structured queries in a particular manner, this disclosure contemplates receiving selections of any suitable structured queries in any suitable manner.

More information on generating structured queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Parsing Search Queries and Generating Query Commands

In particular embodiments, social-networking system 160 may generate a query command based on a structured query received from a querying user. The query command may then be used in a search against objects in a data store 164 of the social-networking system 160. In particular embodiments, the query command may be provided for a search using search indices for one or more data stores or verticals of social-networking system 160. The query command may comprise one or more query constraints. Each query constraint may be identified by social-networking system 160 based on a parsing of the structured query. Each query constraint may be a request for a particular object-type. In particular embodiments, the query command may comprise query constraints in symbolic expression or s-expression. Social-networking system 160 may parse the structured query "Photos I like" to a query command (photos_liked_by:<me>). The query command (photos_liked_by:<me>) denotes a query for photos_liked_by a user (i.e., <me>, which corresponding to the querying user), with a single result-type of photo. The query constraint may include, for example, social-graph constraints (e.g., requests for particular nodes or nodes-types, or requests for nodes connected to particular edges or edge-types), object constraints (e.g., request for particular objects or object-types), location constraints (e.g., requests for objects or social-graph entities associates with particular geographic locations), other suitable constraints, or any combination thereof. In particular embodiments, the parsing of the structured query may be based on the grammar used to generate the structured query. In other words, the generated query command and its query constraints may correspond to a particular grammar (or a sub-tree from a grammar forest). In particular embodiments, a query command may comprise prefix and an object. The object may correspond to a particular node in the social graph 200, while the prefix may correspond to a particular edge 206 or edge-type (indicating a particular type of relationship) connecting to the particular node in the social graph 200. As an example and not by way of limitation, the query command (pages_liked_by:<user>) comprises a prefix pages_liked_by, and an object <user>. In particular embodiments, social-networking system 160 may execute a query command by traversing the social graph 200 from the particular node along the particular connecting edges 206 (or edge-types) to nodes corresponding to objects specified by query command in order to identify one or more search results. As an example and not by way of limitation, the query command (pages_liked_by:<user>) may be executed by social-networking system 160 by traversing the social graph 200 from a user node 202 corresponding to <user> along like-type edges 206 to concept nodes 204 corresponding to pages liked by <user>. Although this disclosure describes generating particular query commands in a particular manner, this disclosure contemplates generating any suitable query commands in any suitable manner.

Figure 5C:
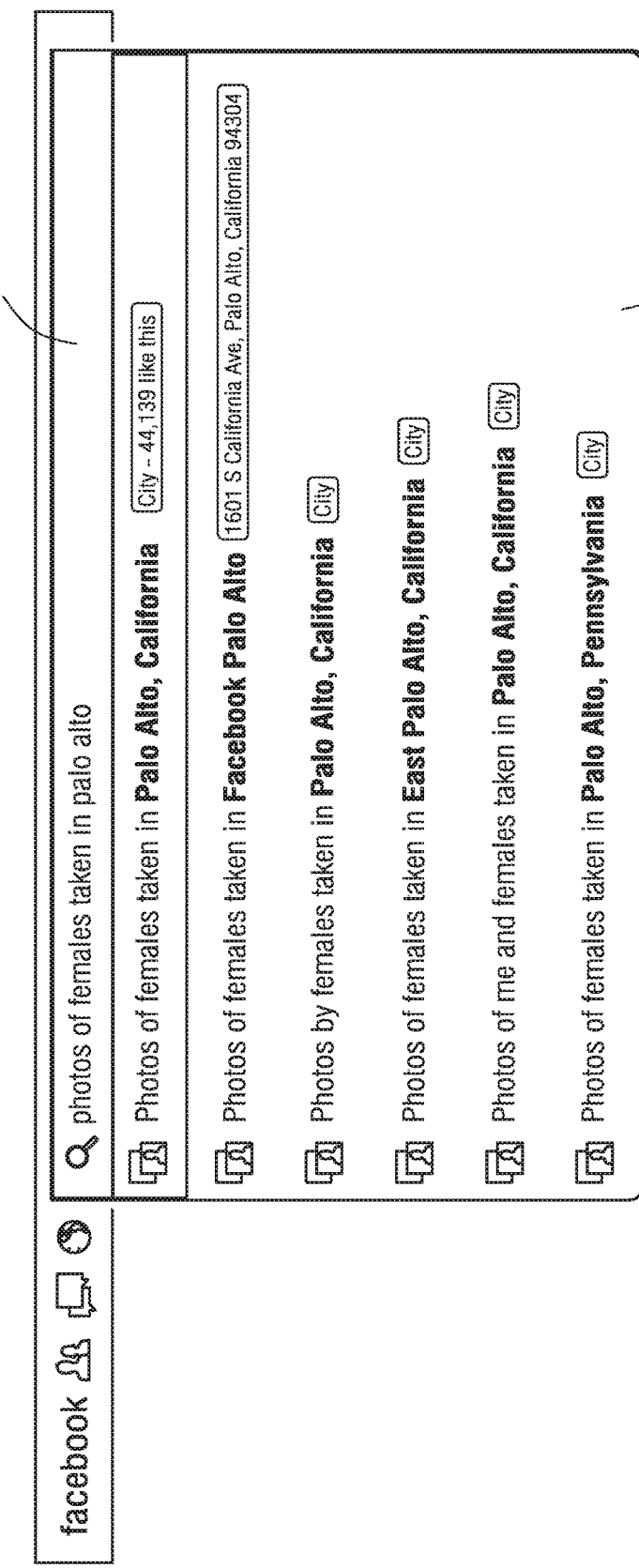

In particular embodiments, social-networking system 160 may identify objects associated with the online social network that satisfy the constraints of a complex structured query having both an inner constraint and an outer constraint, such as a nested search query. The process of searching verticals 164 of objects associated with social-networking system 160 may be improved by using query hinting, where the outer query constraint is used when identifying objects that match the inner query constraint. As an example and not by way of limitation, a relatively complex structured query, such as "Photos of females taken in Palo Alto", as illustrated in FIG. 5C, could be parsed so that a users vertical 164 is first searched to identify users who are female and then to intersect those results with the results from a photos vertical 164 of photos taken in Palo Alto. The user vertical might produce results corresponding to hundred, or even thousands, of female users, none of whom may be tagged in photos taken in Palo Alto, such that the intersect of these results produces no search results. Alternatively, this structured query could be parsed using query hinting, so that the structured query "Photos of females taken in Palo Alto" could be parsed, for example, so that a user vertical is searched to identify users who are female, and by using an operator that allows arguments to be absents from some results, such as a "weak and" (WAND) operator, to identify at least some female user who also are tagged in photos in Palo Alto. Next, the photos vertical 164 could be searched to identify photos taken in Palo Alto where any of the identified female users are tagged. In this way, the search of the vertical corresponding to objects requested by the outer constraint is more likely to generate results that satisfy the search query. This may also allow social-networking system 160 to produce better search results and may improve the processing efficiency for generating these results. In particular embodiments, the results from the vertical searched in response to the inner query constraint could be scored or ranked, and those scores could be used when scoring the objects identified from the vertical searched in response to the outer query constraint. Although this disclosure describes identifying objects matching a structured query a particular manner, this disclosure contemplates identifying objects matching a structured query in any suitable manner.

In particular embodiments, social-networking system 160 may generate a query command comprising an inner query constraint and an outer query constraint. The inner query constraint may comprise a request for one or more search results of a first object-type, and the outer query constraint may comprise a request for one or more search results of a second object type. Each query constraint may be for one or more nodes connected to one or more of the selected nodes referenced in the structured query by one or more of the selected edges referenced in the structured query. The query command with one or more query constraints may comprise nested queries in s-expression. As an example and not by way of limitation, social-networking system 160 may convert the structured query "Pages liked by my friends", to a nested query such as, for example, (pages_liked_by: (friends_of: <me>)). The nested search query (pages_liked_by: (friends_of: <me>)) comprises an inner query constraint (friends_of: <me>) nested in an outer query constraint (pages_liked_by:<user>). The inner query constraint (friends_of: <me>) denotes a query for first-degree friends of a user (i.e., <me>), with a single result-type of user. The outer query constraint (pages_liked_by: <user>) denotes a query for pages liked by a user, with a single result-type of page. As another example and not by way of limitation, social-networking system 160 may convert the structured query "Photos of people named Tom", to a nested query such as, for example, (photos_of: (name: tom)). The nested query (photos_of: (name: tom)) comprises an inner query constraint (name: tom) nested in an outer query constraint (photos_of: <user>). The inner query constraint denotes a query for users whose name matching "Tom", with a single result-type of user. The outer query constraint (photos_of: <user>) denotes a query for photos that a user is tagged in, with a single result-type of photo. As yet another example, social-networking system 160 may convert the structured query "People who wrote posted liked by Bill", to a nested query such as, for example, (extract author (term posts_liked_by: <Bill>)). The query command may request (with an extract operator) a search result of one or more authors for posts that are liked by the user "Bill". The nested query may include an inner query (term posts_liked_by: <Bill>) corresponding to a search term that requests search results in posts that are liked by the user <Bill>. That is, the outer constraint requests a first search result of a first object-type (user), while the inner constraint requests second search results of a second object-type (post). Although this disclosure describes parsing queries in a particular manner, this disclosure contemplates parsing queries in any suitable manner.

In particular embodiments, social-networking system 160 may identify one or more nodes matching one or more query constraints of the query command. Social-networking system 160 may search one or more data stores 164 to identify one or more objects stored in the data stores that satisfy one or more constraints of a query command. As an example and not by way of limitation, social-networking system 160 may submit the query constraint (photos_liked_by: <me>) (with photo result-type) to photo vertical P3. Social-networking system 160 may access index server 330 of photo vertical 164, causing index server 330 to return results for the query constraint (photos_liked_by: <me>). In particular embodiments, social-networking system 160 may, for each query constraint of a query command, access and retrieve search results from at least one of the data stores 164. The accessed data store 164 may be configured to store objects of the object type of specified by the particular query constraint. Social-networking system 160 may then aggregate search results of the respective query constraints. As an example and not by way of limitation, the nested query (photos_of: (name: tom)) comprises the inner query constraint (name: tom) with a single result-type of user, and the outer query constraint (photos_of: <user>) with a single result-type of photo. Social-networking system 160 may then rearrange the nested query and first submit the inner query constraint (name: tom) (with user result-type) to user vertical P1. Social-networking system 160 may access index server 330 of user vertical P1, causing index server 330 to return search results of users <17>, <31>, and <59> (each represented by an user identifier). That is, each user of <17>, <31>, and <59> may have a name matching "tom." Social-networking system 160 may then re-write the nested query to an OR combination of queries (photos_of: <17>), (photos_of: <31>), and (photos_of: <59>)), each with a result-type of photo. Social-networking system 160 may then submit the queries (photos_of: <17>), (photos_of: <31>), and (photos_of: <59>) to photo vertical P3. Social-networking system 160 may access index server 330 of photo vertical P3, causing index server 330 to return search results of photos for the queries (photos_of: <17>), (photos_of: <31>), and (photos_of: <59>). In particular embodiments, social-networking system 160 may aggregate the search results by performing an OR operation on the search results. As an example and not by way of limitation, search results for the search query (photos_of: <17>) may be <1001> and <1002> (each represented by a photo identifier). Search results for the search query (photos_of: <31>) may be <1001>, <1326>, <9090>, and <5200>. Search results for the search query (photos_of: <59>) may be <9090> and <7123>. Social-networking system 160 may perform an OR operation on the search results, yielding final search results of <1001>, <1002>, <1326>, <9090>, <5200>, and <7123>. Although this disclosure describes identifying particular search results in a particular manner, this disclosure contemplates identifying any suitable search results in any suitable manner.

In particular embodiments, when identifying matching nodes for a query constraint, social-networking system 160 may only identify up to a threshold number of matching nodes in a particular vertical 164. This threshold number of matching objects may then be retrieved as search results. The threshold number may be chosen to enhance search quality or to optimize the processing of search results. As an example and not by way of limitation, social-networking system 160 may only identify the top N matching objects in a photos vertical 164 in response to a query command requesting photo objects. The top N photo objects may be determined by a static ranking of the photo objects in a search index corresponding to the photo vertical. In particular embodiments, the top N identified results may be re-ranked based on the search query itself. As an example and not by way of limitation, if N is 1000, the top 1000 photo objects (as determined by a static ranking) may be identified. These 1000 photo objects may then be ranked based on one or more factors (e.g., match to the search query or other query constraints, social-graph affinity, search history, etc.), and the top 20 results may then be generated as search results for presentation to the querying user. In particular embodiments, the top results after one or more rounds of rankings may be sent to an aggregator 320 for a final round of ranking, where results may be reordered, redundant results may be dropped, or any other type of results-processing may occur before presentation to the querying user. Although this disclosure describes identifying particular numbers of search result, this disclosure contemplates identifying any suitable numbers of search results. Furthermore, although this disclosure describes ranking search results in a particular manner, this disclosure contemplates ranking search results in any suitable manner.

In particular embodiments, social-networking system 160 may generate a query command comprising a "weak and" operator (WAND). The WAND operator may allow one or more of its arguments (e.g., keywords or logical expressions comprising operators and keywords) within the query command to be absent a specified number of times or percentage of time. Social-networking system 160 may take into account social-graph elements referenced in the structured query when generating a query command with a WAND operator by adding implicit query constraints that reference those social-graph elements. This information from the social graph 200 may be used to diversify search results using the WAND operator. As an example and not by way of limitation, if a user enters the structured query "Coffee shops in Palo Alto", social-networking system 160 may generate a query command such as, for example:

```
(WAND   category: <coffee shop>
        location: <Palo Alto> : optional-weight 0.3).
```

In this example, instead of requiring that search results always match both the (category: <coffee shop>) and (location: <Palo Alto>) portions of the query command, the Palo Alto portion of the query is optionalized with a weight of 0.3. In this case, this means that 30% of the search results must match the (location: <Palo Alto>) term (i.e., must be connected by an edge 206 to the concept node 204 corresponding to the location "Palo Alto"), and the remaining 70% of the search results may omit that term. Thus, if N is 100, then 30 coffee shop results must have a location of "Palo Alto", and 70 coffee shop results may come from anywhere (e.g. from the global top 100 coffee shops determined by a static ranking of coffee shops). In particular embodiments, the term (category: <coffee shop>) may also be assigned an optional weight, such that the search results need not even always match the social-graph element for "Coffee shop" and some results may be chosen by social-networking system 160 to be any object (e.g. place).

In particular embodiments, social-networking system 160 may generate a query command comprising a "strong or" operator (SOR). The SOR operator may require one or more of its arguments (e.g., keywords or logical expressions comprising operators and keywords) within the query command to be present a specified number of times or percentage of time. Social-networking system 160 may take into account social-graph elements referenced in the structured query when generating a query command with a WAND operator by adding implicit query constraints that reference those social-graph elements. This information from the social graph 200 may be used to diversify search results using the SOR operator. As an example and not by way of limitation, if a user enters the structured query "Coffee shops in Palo Alto or Redwood City", social-networking system 160 may translate a query command such as, for example:

```
(AND    category: <coffee shop>
(SOR    location: <Palo Alto>: optional-weight 0.4
        location: <Redwood City> : optional-weight 0.3)).
```

In this example, instead of allowing search results that match either the (location: <Palo Alto>) or (location: <Redwood City>) portions of the query command, the Palo Alto portion of the query is optionalized with a weight of 0.4 and the Redwood City portion of the query is optionalized with a weight of 0.3. In this case, this means that 40% of the search results must match the (location:<Palo Alto>) term (i.e., are concept nodes 204 corresponding to "coffee shops" that are each connected by an edge 206 to the concept node 204 corresponding to the (location <Palo Alto>), and 30% of the search results must match the (location:<Redwood City>) term, with the remainder of the search result matching either the Palo Alto or Redwood City constraints (or both, if appropriate in certain cases). Thus, if N is 100, then 40 coffee shop results must have a location of "Palo Alto", 30 coffee shop results must have a location of "Redwood City", and 30 coffee shops may come from either location.

In particular embodiments, in response to a query command comprising an inner and outer query constraint, social-networking system 160 may identify a first set of nodes matching an inner query constraint and at least in part matching an outer query constraint. In this way, the process of searching verticals 164 of objects associated with social-networking system 160 may be improved by generating query commands that use query hinting, where the outer query constraint is used when identifying objects that match the inner query constraint. This may also allow social-networking system 160 to produce better search results and may improve the processing efficiency for generating these results. The query command may be formed using, for example, WAND or SOR operators, such that the query command requires a first number of identified nodes to match the inner constraint, or match the inner or outer constraint, and a second number of identified nodes to match both constraints or just the outer constraint, or any combination thereof. The first and second numbers may be, for example, a real number, a percentage, or a fraction. Although this disclosure describes identifying particular social-graph elements as matching particular query constraints in a particular manner, this disclosure contemplates identifying any suitable social-graph elements as matching any suitable query constraints in any suitable manner.

In particular embodiments, identifying a first set of nodes matching the inner query constraint and at least in part matching the outer query constraint may comprise identifying a first number of nodes matching at least the inner query constraint and identify a second number of nodes matching both the inner query constraint and the outer query constraint. The query command may be formed such that it requires that at least a first number of search results returned in response to the query command match both the inner and outer query constraints, while permitting at least a second number of the search results to match only the inner constraint (e.g. as in the case of using the WAND operator). As an example and not by way of limitation, in response to the structured query "Photos of females taken in Palo Alto", social-networking system 160 may generate a query command to resolve the inner query constraint such as, for example,

```
(WAND
    (term gender_to_user: <female>)
    (term photo_place_tag_to_user: <Palo Alto> : optional-weight 0.9)).
```

In this case, the inner constraint would be to identify female users, and the outer constraint would be to identify photos of the identified female users taken in the city of Palo Alto. When searching the users vertical 164 to identify matching user nodes 202 for the inner constraint, rather than just specifying that female users should be identified (which may identify numerous female users who are not tagged in any photos in Palo Alto), the query command specifies that at least 90% of the user results must be females who are also tagged in photos in Palo Alto. In this way, the index is denormalized by adding the additional constraint (term photo_place_tag_to_user: <Palo Alto>:optional-weight 0.9). The remaining 10% of the user results need only match the "female" constraint. Thus, query hinting is used so that the outer query constraint is considered when resolving the inner query constraint. Next, the photos vertical 164 could be searched to identify photos taken in Palo Alto where any of the previously identified female users are tagged. Because 90% of the nodes identified by the search of the users vertical 164 are already identified as being female users who have been tagged in photos in Palo Alto, the search of the photos vertical 164 is more likely to be able to produce a relatively large number of photos where the identified females are tagged. Although this disclosure describes identifying particular social-graph elements as matching particular query constraints in a particular manner, this disclosure contemplates identifying any suitable social-graph elements as matching any suitable query constraints in any suitable manner.

In particular embodiments, identifying a first set of nodes matching the inner query constraint and at least in part matching the outer query constraint may comprise identifying a first number of nodes where each node matches either the inner or outer query constraints and identify a second number of nodes where each node matches both the inner and outer query constraints. The query command may be formed such that at least a first number of search results returned in response to the query command match the inner constraint, and that at least a second number of search results match the outer constraint, with the remainder matching either the inner constraint or the outer constraint (e.g. as in the case of using the SOR operator). As another example and not by way of limitation, in response to the structured query "Photos of Mark and women", social-networking system 160 may generate a query command to resolve the inner query constraint such as, for example,

```
(WAND
    (term gender_to_user:<female>)
    (SOR: optional-weight 0.8
        (term friend_of:<Mark>: optional-weight: 0.7)
        (term non_friend_in_same_photo:<Mark> :optional-weight: 0.1))).
```

In this case, the inner constraint would be to identify female users, and the outer constraint would be to identify photos of the identified female users taken with the user "Mark". When searching the users vertical 164 to identify matching user nodes 202 for the inner constraint, rather than just specifying that female users should be identified (which may identify numerous female users who are not tagged in any photos with the user "Mark"), the query command specifies that at least 80% of the user results must be females who also match one of the constraints in the SOR constraint, where the SOR constraint specifies that 70% of the user results must match the (friend_of: <Mark>) constraint, and 10% of the user results must match the (non_friend_in_same_photo: <Mark>) constraint, with the remainder of the search results matching either constraint (or both, if appropriate). Thus, if N is 100, then 20 user results must simply be female, 56 user results must be females who are friends of the user "Mark", 8 user results must be females who are non-friends of "Mark" who happen to be tagged in a photo with "Mark", and 16 user result must be female and either friends of "Mark" or non-friends tagged in a photo with "Mark". In this way, the index is denormalized by adding various additional constraints, which may also help generate diversity of results. Thus, query hinting is used so that the outer query constraint (i.e., being in a photo with the user "Mark") is considered when resolving the inner query constraint. Next, the photos vertical 164 could be searched to identify photos taken with the user "Mark" where any of the previously identified female users are tagged. Because 80% of the nodes identified by the search of the users vertical 164 are already identified as being female users with some type of relationship to the user "Mark", the search of the photos vertical 164 is more likely to be able to produce photos that satisfy the search query. Although this disclosure describes identifying particular social-graph elements as matching particular query constraints in a particular manner, this disclosure contemplates identifying any suitable social-graph elements as matching any suitable query constraints in any suitable manner.

In particular embodiments, social-networking system 160 may score one or more nodes identified as matching a query constraint. The identified nodes may be scored in any suitable manner. When a query command includes a plurality of query constraints, social-networking system 160 may score the nodes matching each query constraint independently or jointly. Social-networking system 160 may score the first set of identified nodes by accessing a data store 164 corresponding to the object-type of the identified nodes. As an example and not by way of limitation, when generating identified nodes matching the query constraint (extract authors: (term posts_liked_by: <Mark>)), social-networking system 160 may identify the set of users (<Tom>, <Dick>, <Harry>) in the user vertical 164. Social-networking system 160 may then score the users <Tom>, <Dick>, and <Harry> based on their respective social-affinity with respect to the user <Mark>. For example, social-networking system 160 of the post vertical 164 may then score the identified nodes of users <Tom>, <Dick>, and <Harry> based on a number of posts in the list of posts liked by the user <Mark>. The users <Tom>, <Dick>, and <Harry> may have authored the following posts liked by the user <Mark>: <post 1>, <post 2>, <post 3>, <post 4>, <post 5>, <post 6>. If user <Dick> authored posts <post 1>, <post 2>, <post 3>, user <Tom> authored posts <post 5> and <post 6>, and user <Harry> authored post <post 4>, social-networking system 160 may score user <Dick> as highest since his authored most of the posts in the list of posts liked by the user <Mark>, with <Tom> and <Harry> having consecutively lower scores. As another example and not by way of limitation, using the prior example, social-networking system 160 may access a forward index that maps a post to a count of likes of the post. The index server may access the forward index and retrieve counts of likes for each post of the list of posts liked by the user <Mark>. The index server may score the posts in the list of posts (i.e., <post 1>, <post 2>, <post 3>, <post 4>, <post 5>, <post 6>) based on respective counts of likes, and return to social-networking system 160 authors of top scored posts (e.g., top 3 scored or most liked posts) as the first identified node. After each appropriate scoring factor is considered for a particular identified node, an overall score for the identified node may be determined. Based on the scoring of the nodes, social-networking system 160 may then generate one or more sets of identified nodes. As an example and not by way of limitation, social-networking system 160 may only generate a set of identified nodes corresponding to nodes having a score greater than a threshold score. As another example and not by way of limitation, social-networking system 160 may rank the scored nodes and then only generate a set of identified nodes corresponding to nodes having a rank greater than a threshold rank (e.g., top 10, top 20, etc.). Although this disclosure describes scoring matching nodes in a particular manner, this disclosure contemplates scoring matching nodes in any suitable manner.

In particular embodiments, social-networking system 160 may score a second set of nodes based at least in part on the scores of a first set of nodes. The search results may be scored in any suitable manner. When a query command includes a plurality of query constraints, social-networking system 160 may score the nodes matching each query constraint separately. Alternatively, social-networking system 160 may utilize the score from one set of nodes when scoring one or more other sets of nodes. For a query command with an inner constraint and an outer constraint, social-networking system 160 may identify a first set of nodes matching the inner query constraint and then score these nodes. Social-networking system 160 may then identify a second set of nodes matching the outer query constraint, and score the second set of nodes based at least in part on the scores of the first set of nodes. As an example and not by way of limitation, in response to the structured query "Pages liked by my friends", social-networking system 160 may generate a query command such as, for example, (pages_liked_by: (friends_of: <me>)). Social-networking system 160 may first resolve the inner query constraint by accessing a users vertical 164 and identifying a first set of nodes corresponding to the inner query constraint, which requests users that are friends of the querying user. This first set of users may comprise (<Tom>, <Dick>, <Harry>), who may each correspond to a respective user nodes 202 that is connected by a friend-type edge 206 to the user node 202 of the querying user. Social-networking system 160 may then score this first set of nodes in any suitable manner. For example, the set of users may be scored based on their respective social-graph affinity with respect to the querying user, where the user "Dick" may have the best affinity in the set, "Harry" may have the second-best affinity, and "Tom" may have the worst affinity in the set. Next, social-networking system 160 may resolve the outer query constraint by accessing a pages vertical 164 and identify a second set of nodes corresponding to the outer query constraint, which requests pages liked by the users in the first set (i.e., pages corresponding to concept nodes 204 that are connected by like-type edges 206 to at least one of the user nodes 202 corresponding to the users "Tom", "Dick", and "Harry"). The users "Tom", "Dick", and "Harry" may have liked the following pages: (, , , , ). Social-networking system 160 may then score this second set of nodes in any suitable manner. For example, the set of pages may be scored based on their overall popularity on the online social network, where pages that are more globally popular are scored respectively better than pages that are less popular. The set of pages may also be scored based at least in part on the scores of the first set of nodes. For example,  may be liked by "Tom",  may be liked by "Dick",  may be liked by "Harry",  may be liked by "Tom" and "Harry", and  may be liked by "Tom", "Dick", and "Harry". In this case, social-networking system 160 may score the second set of nodes based on in part of the first set of node by improving the scores of pages liked by users with better affinities and downgrading (or at least improving less) the scores of pages liked by users with worse affinities. For example, since the user "Dick" has the best affinity with respect to the querying user, the pages liked by "Dick" (which are , and ) may all have their scores improved. Similarly, since the user "Tom" has the worst affinity with respect to the querying user, pages liked by "Tom" (which are , , and ) may all have their scored downgraded (or at least not improved as much). After each appropriate scoring factor is considered for a particular identified node, an overall score for the identified node may be determined. Based on the scoring of the nodes, social-networking system 160 may then generate one or more sets of identified nodes. As an example and not by way of limitation, social-networking system 160 may only generate a set of identified nodes corresponding to nodes having a score greater than a threshold score. As another example and not by way of limitation, social-networking system 160 may rank the scored nodes and then only generate a set of identified nodes corresponding to nodes having a rank greater than a threshold rank (e.g., top 10, top 20, etc.). Although this disclosure describes scoring nodes in a particular manner, this disclosure contemplates scoring nodes in any suitable manner.

In particular embodiments, social-networking system 160 may generate one or more search results based on a first set of nodes identified as matching the inner query constraint and at least in part matching the outer query constraint, and further based on a second set of nodes identified as matching the outer query constraint. Each search result may correspond to a node of the plurality of nodes. As discussed previously, the nodes identified as matching the inner query constraint, which may be identifying using query hinting from the outer query constraint, may then be used as a basis for identifying nodes matching the outer query constraint. The nodes identified as matching the outer query constraint may be scored (and possibly ranked), and then one or more (e.g., a threshold number) may be generated as search result to display to the user. The search results may be presented and sent to the querying user as a search-results page, where the generated search results are displayed. As an example and not by way of limitation, in response to the structured query "Photos of females taken in Palo Alto", as illustrated in FIG. 5C, social-networking system 160 may identify a first set of nodes matching the inner query constraint using query hinting. In this example, the inner constraint requests users who are female, and where query hinting may be used so that a number of the users identified in the first set are users who are also tagged in photos in the city of Palo Alto. Next, social-networking system 160 may identify a second set of nodes matching the outer query constraint. In this example, the outer constraint requests photos of users in the first set that are taken in Palo Alto. One or more search results may then be generated based on the nodes identified in the second set of nodes. The generated search results may then be sent and displayed to the querying user as part of a search-results page corresponding to the structured query "Photos of females taken in Palo Alto". The search-results page may display the search results, for example, as thumbnails of the photos corresponding to the nodes identified in the second set. Although this disclosure describes generating particular search results in a particular manner, this disclosure contemplates generating any suitable search results in any suitable manner.

Figure 6:
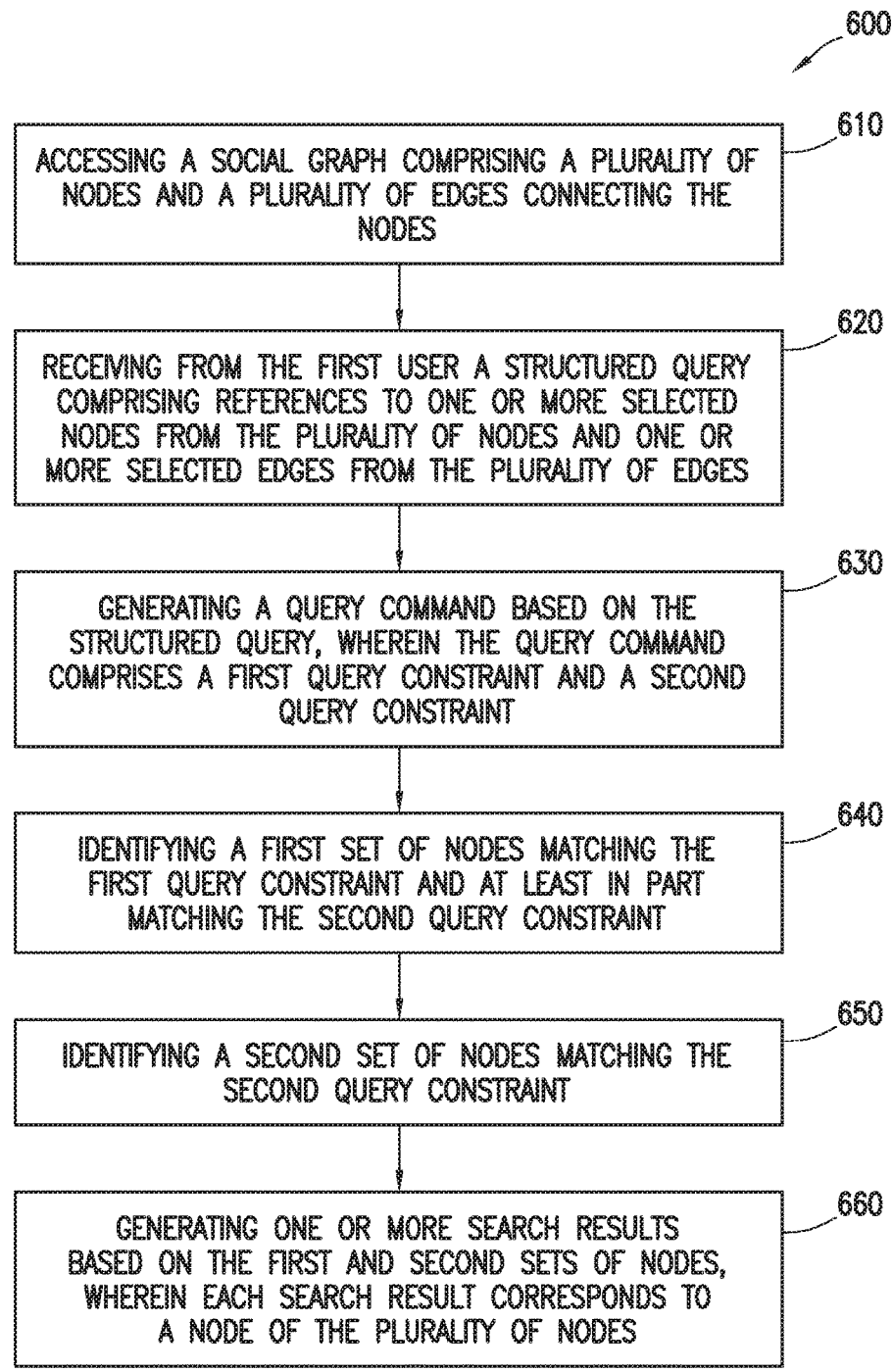
FIG. 6 illustrates an example method for generating search results in response to a search query with an inner constraint and an outer constraint.

FIG. 6 illustrates an example method 600 for generating search results in response to a search query with an inner constraint and an outer constraint. The method may begin at step 610, where social-networking system 160 may access a social graph 200 comprising a plurality of nodes (e.g., user nodes 202 or concept nodes 204) and a plurality of edges 206 connecting the nodes. Each edge between two nodes may represent a single degree of separation between them. The nodes may comprise a first node (e.g., a first user node 202) corresponding to a first user associated with the online social network. The nodes may also comprise a plurality of second nodes that each correspond to a concept or second user associate with the online social network. At step 620, social-networking system 160 may receive from the first user a structured query comprising references to one or more selected nodes from the plurality of nodes and one or more selected edges from the plurality of edges. At step 630, social-networking system 160 may generate a query command based on the structured query. The query command comprises a first query constraint and a second query constraint (e.g., an inner constraint and an outer constraint). At step 640, social-networking system 160 may identify a first set of nodes matching the first query constraint and at least in part matching the second query constraint. At step 650, social-networking system 160 may identify a second set of nodes matching the second query constraint. At step 660, social-networking system 160 may generate one or more search results based on the first and second sets of nodes. Each search result may correspond to a node of the plurality of nodes. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 5D:
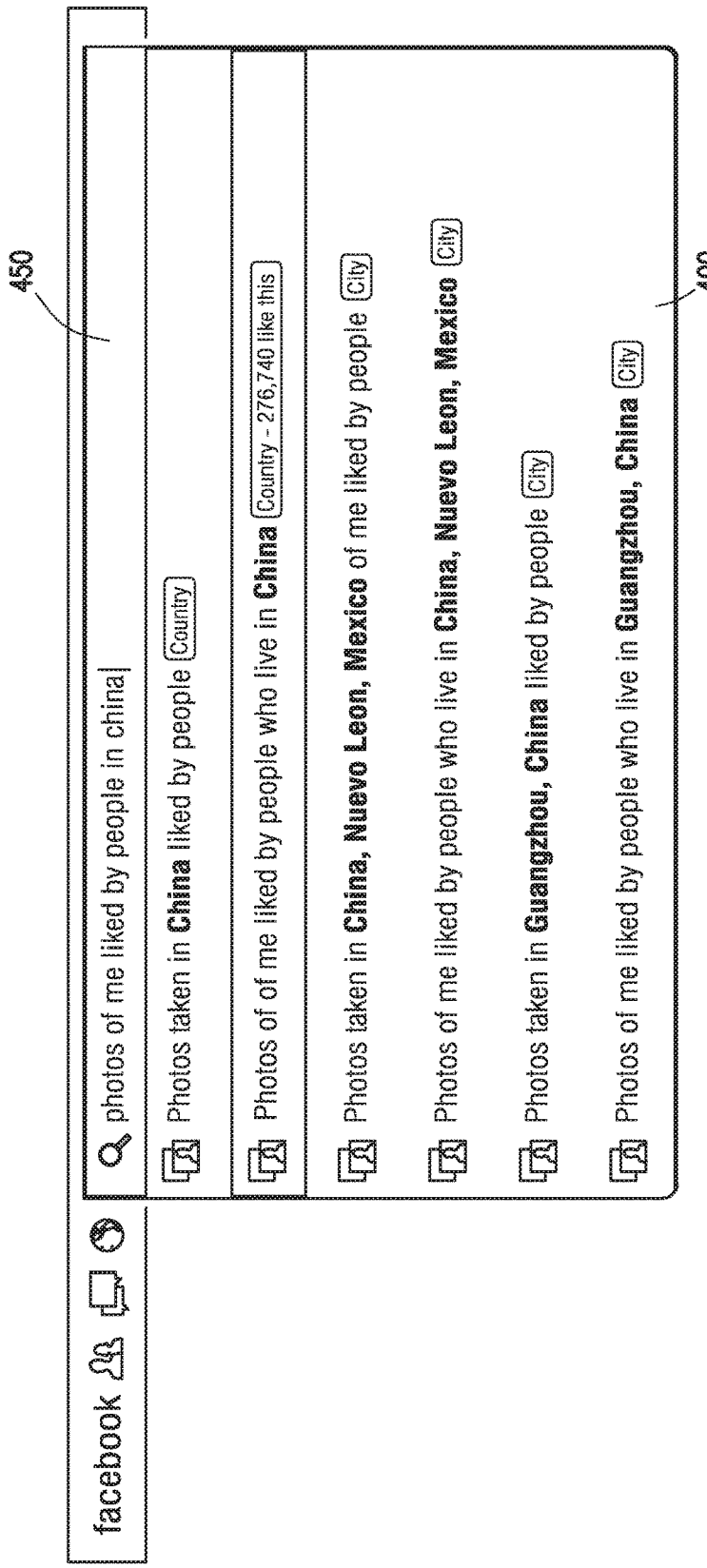

In particular embodiments, social-networking system 160 may parse structured search queries and generate query commands that include inverse operators. The process of searching verticals 164 of objects associated with social-networking system 160 may be improved by using inverse operators, where one of the query constraints may be modified to include its inverse constraint. When parsing a structured query having both an inner query constraint and an outer query constraint, such as a nested search query, the typical processing of the query may produce an inadequate number of search results. This may happen, for example, because the inner query constraint produces too many results, reducing the likelihood that any of them will satisfy the outer query constraint. As an example and not by way of limitation, a relatively complex structured query, such as "Photos of me liked by people in China", as illustrated in FIG. 5D, could be parsed as (intersect(photos_of: <me>, photos_liked_by: (users_from: <China>))). When this parsing is executed, it would first search a users vertical 164 to identify users located in China and then interest those results with the results from a photo vertical 164 to identify photos of the querying user that are liked by one of the identified users in China. However, the first search of the users vertical 164 might produce results corresponding to hundreds, or even thousands, of users in China, none of whom may have liked any photos of the querying user. Alternatively, this structured query could be parsed using an inverse operator. In particular embodiments, certain operators may correspond to particular inverse operators. As an example and not by way of limitation, instead of using a "liked_by" operator, the structured query may instead be parsed to include its inverse operator, i.e., a "likers_of" operator. In other words, instead of searching for photos liked by users in China, to instead searches for "likers_of" photos of the querying user. For example, the structured query "Photos of me liked by people in China" could be parsed as (intersect(photos_of: <me>, photos_liked_by: (intersect(likers_of(photos_of: <me>), users_from: <China>)))). This would change the processing order of the query so that first the photos vertical 164 is access to identify photos of the querying user and then the likers of those photos can be identified. Next, the users vertical 164 could be searched to identify which of the likers, if any, live in China. In this way, an inverse operator may be used so that the search of the first vertical 164 produces better results. This may also allow social-networking system 160 to produce better search results and may improve the processing efficiency for generating these results. Although this disclosure describes identifying objects matching a structured query a particular manner, this disclosure contemplates identifying objects matching a structured query in any suitable manner.

In particular embodiments, the search indices for a vertical 164 corresponding to an object-type may comprise an inverted index. An inverted index for a first object-type may map a query term associated with a second object-type to one or more objects of the first object-type. As an example and not by way of limitation, an inverted index in the post vertical 164 may map a query term associated with a user such as (posts_liked_by: <user>) from <user> to a list posts liked by <user>. Similarly, the inverted index may map a query term associated with a user such as (posts_commented_by: <user>) from <user> to a list of posts commented by <user>. As another example and not by way of limitation, an inverted index in the photo vertical 164 may map a query term associated with a user such as (photos_liked_by: <user>) from <user> to a list of photos liked by <user>. Similarly, the inverted index may map a query term associated with a user (photos_of: <user>) from <user> to a list of photos that <user> is tagged in. In particular embodiments, an inverted index for a vertical 164 corresponding to an object-type may map a query term associated with the object-type to one or more objects of the object-type. As an example and not by way of limitation, an inverted index in the user vertical 164 may map a query term associated with a user such as (friends: <user>) from <user> to a list of friends (i.e., of user object-type) of <user>. In particular embodiments, an inverted index may map one to many for a query term. As an example and not by way of limitation, an inverted index of the photo vertical 164 may map a user to many photos (e.g., more than 100 photos) that the user is tagged in. Although this disclosure describes searching verticals 164 in a particular manner, this disclosure contemplates searching verticals in any suitable manner.

In particular embodiments, the search indices for a vertical 164 corresponding to an object-type may comprise a forward index. A forward index for a first object-type may map a query term associated with the first object-type to one or more objects of a second object-type. As an example and not by way of limitation, a forward index in the post vertical 164 may map a query term associated with a post such as (likers_of: <post>) from <post> to a list of users who like <post>. Similarly, the forward index may map a query term associated with a post such as (author_of: <post>) from <post> to a user who is the author of <post>. As another example and not by way of limitation, a forward index in the photo vertical 164 may map a query term associated with a photo such as (tagged_in: <photo>) from <photo> to a list of users who are tagged in <photo>. Similarly, the forward index may map a query term associated with a photo (commenters_of: <photo>) from <photo> to a list of users who comment on <photo>. In particular embodiments, a forward index may comprise a one-to-one mapping for a query term. As an example and not by way of limitation, a forward index of the photo vertical 164 may map a photo to an owner of the photo (e.g., the user who uploaded the photo to social-networking system 160). In particular embodiments, a forward index may comprise a one-to-few mapping for a query term. As an example and not by way of limitation, a forward index in the photo vertical 164 may map a photo to a few users (e.g., less than 10 users) who are tagged in the photo. Although this disclosure describes searching verticals 164 in a particular manner, this disclosure contemplates searching verticals in any suitable manner.

In particular embodiments, after parsing a structured query to identify a plurality of query constraints, social-networking system 160 may identify an inverse constraint associated with one of the query constraints. An inverse constraint essentially reverses the order that verticals 164 are searched when executing a structured query. If a particular query constraint requests search results of a first object-type having a particular connection to a second object-type, its corresponding inverse constraint may request search results of the second object-type have that connection with the first object-type. Using inverse constraints may be particular useful with nested queries when the inner query constraint produces too many results, reducing the likelihood that any of them will satisfy the outer query constraint. If the query constraint is for a particular object-type, the inverse constraint may be for a different object-type, or the same object-type. In particular embodiments, the query constraint may be for a first object-type corresponding to one or more nodes of a first node-type that are each connected by one of the selected edges referenced in the structured query to one or more nodes of a second node-type, and the inverse constraint may be for a second object-type corresponding to corresponding to one or more nodes of the second node-type that are connected by the one of the selected edges referenced in the structured query to one or more nodes of the first node-type. As an example and not by way of limitation, if the first constraint is for (posts_liked_by: <user>), this query constraint will search for concept nodes 204 corresponding to posts objects that are connected by like-type edges 206 to a particular user node 202 (or type of user node 202). The inverse constraint for the first constraint may be, for example, (likers_of: <posts>), which will search for user nodes 202 that are connected by like-type edges 206 to particular concept nodes 204 (or types of concept nodes 204) corresponding to particular posts. In other words, instead of searching for photos liked by users by using a "liked_by" operator, the inverse constraint will search for users who like photos by using a "likers_of" operator. In particular embodiments, both the query constraint and its inverse constraint may be for the same object-type. As another example and not by way of limitation, if the first constraint is for (followers_of: <user>), this query constraint will search for one or more first users who subscribe or follow a second user. The inverse constraint for the first constraint may be, for example, (users_followed_by: <user>), which will search for one or more second users followed by a first user (or followed by a first type of user). Although this disclosure describes identifying particular inverse constraints in a particular manner, this disclosure contemplates identifying any suitable inverse constraints in any suitable manner.

In particular embodiments, social-networking system 160 may generate a query command based on a structured query that includes an inverse constraint. Where the parsing of a structured query identifies a first query constraint and one or more second query constraints, social-networking system 160 may identify an inverse constraint for the first query constraint and then generate a query command comprising the inverse constraint and the one or more second query constraints. In particular embodiments, social-networking system 160, generating a query command that includes an inverse constraint may comprise generating a query command that searches a forward index instead of an inverted index. As an example and not by way of limitation, if the first query constraint is (posts_authored_by: <user>), this query constraint may search a post vertical 164 using an inverse index that maps from <user> to a list of posts authored by <user>. Social-networking system 160 may then generate a query command using an inverse constraint of (posts_authored_by: <user>), which may be, for example, (authors_of: <post>), which may search a users index 164 using a forward index that maps from <posts> to a lists of users that authored the <posts>. In particular embodiments, the first query constraint may itself be a nested query having an inner constraint and an outer constraint. In this case, the generated query command may comprise an intersect of the first inverse constraint and the inner constraint. As an example and not by way of limitation, in response to the structured query "Photos of me liked by people in China", social-networking system 160 could parse the structured query to generate a query command such as, for example: intersect (photos_of: <me>, photos_liked_by: (users_from: <China>)). However, executing this query command may produce an inadequate number of search results since the inner constraint (users_from:<China>) may identify a large number of user nodes 202 that do not satisfy the outer constraint (photos_liked_by:<users>). Thus, social-networking system 160 may then generate a query command using an inverse constraint, such as, for example, (intersect (photos_of: <me>, photos_liked_by: (intersect(likers_of (photos_of: <me>), users_from: <China>)))). In this example, based on the "liked_by" operator from the outer constraint, social-networking system 160 has modified the query command to include the inverse "likers_of" operator in the inner constraint, and intersected this with the inner query constraint (users_from:<China>). This will reverse the order in which object-types are searched in verticals 164, such that instead of searching for photos liked by users in China, to instead search for users who are "likers_of" photos of the querying user and to intersect those results with a search for users in China. In particular embodiments, a query command generated using an inverse constraint also be generated using query hinting as described previously, for example, by incorporating WAND and SOR operators, such that the query command requires a first number of identified nodes to match the inner constraint, or match the inner or outer constraint, and a second number of identified nodes to match both constraints or just the outer constraint, or any combination thereof. The first and second numbers may be, for example, a real number, a percentage, or a fraction. Although this disclosure describes generating particular query commands in a particular manner, this disclosure contemplates generating any suitable query commands in any suitable manner.

In particular embodiments, in response to a query command comprising an inverse constraint, social-networking system 160 may identify a first set of nodes matching the inverse constraint. As previously described, social-networking system 160 may also identify one or more second sets of nodes matching one or more additional query constraints, respectively, of the query command. Matching nodes may be identified in any suitable manner, such as, for example, by referencing search indices as discussed previously. In particular embodiments, social-networking system 160 may identify one or more nodes of the plurality of one or more nodes of the plurality of nodes that is connected by one or more selected edges referenced in the structured query to one or more of the nodes in the first set of nodes. As an example and not by way of limitation, in response to the structured query "Photos of me liked by people in China", social-networking system 160 may generate a query command using an inverse constraint, such as, for example (intersect(photos_of: <me>, photos_liked_by: (intersect(likers_of(photos_of: <me>), users_from: <China>)))). Here, the references in the structured query to "me" and "China" refer to particular social-graph elements, i.e., a user node 202 corresponding to the querying user and a concept node 204 corresponding to the location "China". Similarly, the references to "photos of me" and "liked by" refer to particular edge-types connecting the referenced nodes to the desired search results. In this case, the query constraint (photos_liked_by: (intersect(likers_of(photos_of: <me>), users_from: <China>))) is itself a nested query, where the inner constraint requests users who are "likers_of" photos of the querying user and users who are from China. When searching the users vertical 164 to identify matching user nodes 202 for the constraint (likers_of(photos_of: <me>)), social-networking system 160 may be able to identify a relatively small set of nodes, since the number of users who have liked photos of the querying user is likely a relatively small number (e.g., tens to hundreds of users). Next, social-networking system 160 may search the users vertical 164 to identify matching user nodes 202 for the constraint (users_from: <China>). Note that the constraint (users_from: <China>) could produce thousands or millions of results, most of which would likely not satisfy the query command. However, by intersecting this with the objects identified by the inverse constraint, a more reasonably sized set of objects is identified corresponding to users from China who like photos of the querying user. Once this inner constraint is resolved, the set of identified users may be used to resolve the outer constraint, which is to identify photos liked by users identified by the inner constraint. This set of photos may then be intersected with the results of the constraint (photos_of: <me>), so that a set of photo of the querying user liked by users from China is identified. Although this disclosure describes identifying particular social-graph elements as matching particular inverse constraints in a particular manner, this disclosure contemplates identifying any suitable social-graph elements as matching any suitable inverse constraints in any suitable manner.

In particular embodiments, social-networking system 160 may generate one or more search results based on a first set of nodes identified as matching the inverse query constraint and one or more second sets of nodes matching one or more query constraints, respectively. Each search result may correspond to a node of the plurality of nodes. The nodes identified as matching the query command may be scored (and possibly ranked), and then one or more (e.g., a threshold number) may be generated as search result to display to the user. The search results may be presented and sent to the querying user as a search-results page, where the generated search results are displayed. As an example and not by way of limitation, in response to the structured query "Photos of me liked by people in China", as illustrated in FIG. 5D, social-networking system 160 may identify a first set of nodes matching the inverse constraint. In this example, the inner constraint (as modified by the inverse constraint) requests users from China who are also likers of photos of the querying user. Next, social-networking system 160 may identify a second set of nodes matching the outer query constraint. In this example, the outer constraint requests photos of the querying user liked by one of the users in the first set. One or more search results may then be generated based on the nodes identified in the second set of nodes. The generated search results may then be sent and displayed to the querying user as part of a search-results page corresponding to the structured query "Photos of me liked by people in China". The search-results page may display the search results, for example, as thumbnails of the photos corresponding to the nodes identified in the second set. In particular embodiments, social-networking system 160 may generate a search result for each node identified in both the first set of nodes and the second sets of nodes. In particular embodiments, social-networking system 160, each search result generated by social-networking system 160 may correspond to a nodes of the first set of nodes that is connected by one or more selected edges referenced in the structured query to one or more nodes in the second set of nodes (or vice versa). Although this disclosure describes generating particular search results in a particular manner, this disclosure contemplates generating any suitable search results in any suitable manner.

In particular embodiments, social-networking system 160 may generate a query command comprising an inverse constraint when an initial query command generates below a threshold number of search result. When parsing a nested search query, the typical processing of the query may produce an inadequate number of search results. This may happen, for example, because the inner query constraint produces too many results, reducing the likelihood that any of them will satisfy the outer query constraint, and thus few or no search results may be generated. Inverse constraints may be used in particular scenarios where the original parsing of a structured query generates a query command that produces an inadequate number of search results. In particular embodiments, inverse constraints may be used when particular query constraints are identified during parsing of a structured query. Particular query constraints may have already been identified as being suitable for substitution using an inverse constraint. In other words, particular query constraints may be flagged as being likely to identify too many objects, so that an inverse constraint is used in its place. As an example and not by way of limitation, social-networking system 160 may store (e.g., at aggregator 320) a list of query constraints where the set generated by the query constraint is likely to be large (e.g., (users_from: <country>), or (likers_of: ) for pages having large numbers of likers). When a query constraint on the list is identified during parsing of a query, social-networking system 160 may then automatically generate a query command using an inverse constraint of the listed constraint. In particular embodiments, inverse constraints may be used when query hinting is used to parse nested search queries, such as, for example, when the inner query constraint identifies a large number of objects that do not satisfy the outer query constraint. Inverse constraints may be particular useful in scenarios where the initial parsing of a structured query produces a query command that has an inner constraint that requests a large number of objects that do not satisfy the outer constraint. As an example and not by way of limitation, social-networking system 160 may determine a number of nodes satisfying a first query constraint. If the number of nodes is greater than a threshold number of nodes, then social-networking system 160 may generate the query command with the first inverse constraint. Else, social-networking system 160 may generate the query command with the first query constraint. In other words, if the original parsing of the structured query produces a query command that identifies too many objects, then an inverse constraint may be used instead to narrow the number of results generated. As another example and not by way of limitation, social-networking system 160 may generate a preliminary query command based on the structured query. This preliminary query command may include the first query constraint and the one or more second query constraints. In this scenario, the preliminary query command may be considered the default or normal parsing of the structured query. Social-networking system 160 may then generate a first set of search results based on the preliminary query command. If the first set of search results is less than a threshold number of search results, then social-networking system 160 may generate the query command with the first inverse constraint and then generate a second set of search results based on the query command with the first inverse constraint (for example, by identifying new sets of nodes matching the inverse constraint and the outer constraints). In other words, if the original parsing of the structured query generates too few search results, then an inverse constraint may be used to improve the search results. Although this disclosure describes generating particular query commands in a particular manner, this disclosure contemplates generating any suitable query commands in any suitable manner.

Figure 7:
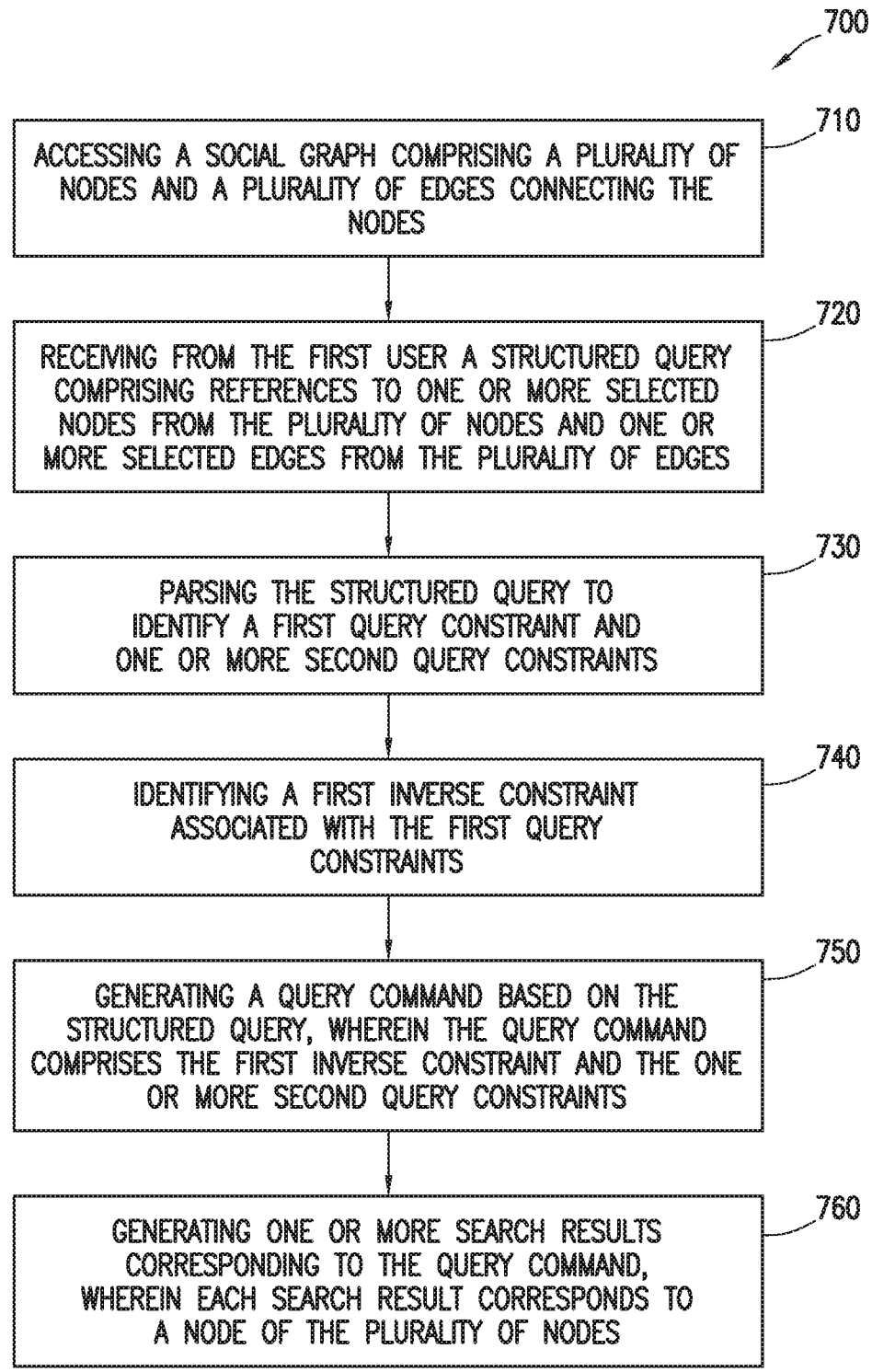
FIG. 7 illustrates an example method for parsing search queries using inverse operators.

FIG. 7 illustrates an example method 700 for parsing search queries using inverse operators. The method may begin at step 710, where social-networking system 160 may access a social graph 200 comprising a plurality of nodes (e.g., user nodes 202 or concept nodes 204) and a plurality of edges 206 connecting the nodes. Each edge between two nodes may represent a single degree of separation between them. The nodes may comprise a first node (e.g., a first user node 202) corresponding to a first user associated with the online social network. The nodes may also comprise a plurality of second nodes that each correspond to a concept or second user associate with the online social network. At step 720, social-networking system 160 may receive from the first user a structured query comprising references to one or more selected nodes from the plurality of nodes and one or more selected edges from the plurality of edges. At step 730, social-networking system 160 may parse the structured query to identify a first query constraint and one or more second query constraints. At step 740, social-networking system 160 may identify a first inverse constraint associated with the first query constraints. At step 750, social-networking system 160 may generate a query command based on the structured query. The query command may comprise the first inverse constraint and the one or more second query constraints. The query command may also comprise the first query constraint. At step 760, social-networking system 160 may generate one or more search results corresponding to the query command. Each search result may correspond to a node of the plurality of nodes. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Generating Search Results Based on Intent

In particular embodiments, in response to a structured query received from a querying user, social-networking system 160 may generate one or more search results, where the search results correspond to the structured query. Social-networking system 160 may identify objects (e.g., users, photos, profile pages (or content of profile pages), etc.) that satisfy or otherwise match the structured query. A search result corresponding to each identified object may then be generated. As an example and not by way of limitation, in response to the structured query "Photos of Matt and Stephanie", social-networking system 160 may identify a photo where the user's "Matt" and "Stephanie" are both tagged in the photo. A search result corresponding to this photo may then be generated and sent to the user. In particular embodiments, each search result may be associated with one or more objects, where each query constraint of the structured query is satisfied by one or more of the objects associated with that particular search result. As an example and not by way of limitation, continuing with the prior example, in response to the structured query "Photos of Matt and Stephanie", social-networking system 160 may parse the query to generate the query command (intersect(photos_of <Matt>), (photos_of <Stephanie>)), which could be executed to generate a search result corresponding to a photo where the user's "Matt" and "Stephanie" (who were both referenced in the structured query) are both tagged_in the photo (i.e., their user nodes 202 are connected by tagged-in-type edges 206 to the concept node 204 corresponding to the photo). In other words, the constraints for (photos_of <Matt>) and (photos_of:<Stephanie>) are both satisfied by the photo because it is connected to the user nodes 202 for the user's "Matt" and "Stephanie". Although this disclosure describes generating search results in a particular manner, this disclosure contemplates generating search results in any suitable manner.

In particular embodiments, social-networking system 160 may generate search results based on a search intent of the querying user. The search results (e.g., the identified nodes or their corresponding profile pages) may be scored (or ranked) and presented to the user according to their relative degrees of relevance to the search query, as determined by the particular search algorithm used to generate the search results. The search results may also be scored and presented to the user according to their relative degree of relevance to the user. In particular embodiments, the search algorithm used to score the search results may be varied based on the search intent of the querying user. Search intent refers to the intent of the querying user with respect to the type of search query and/or the type of search mode that the user is in. In response to a search query, social-networking system 160 may determine one or more search intents for the search query. Search intent may be determined in a variety of ways, such as, for example, based on social-graph elements referenced in the search query, terms within the search query, user information associate with the querying user, search history of the querying user, pattern detection, other suitable information related to the query or the user, or any combination thereof. The search algorithm used to generate search results may be modified based on these search intents, such that the way search results are ranked in response to one query may be different from the way search results are ranked in response to another query. As an example and not by way of limitation, if the querying user is interested in identifying other users that the querying user might be interested in dating, the search results generated in response to a search query with a dating intent may rank the results such that users who indicate they are "single" are ranked higher than users who indicate they are "in a relationship". Similarly, if the querying user is interested in identifying users to network with in order to find a job, the search result generated in response to a search query with a networking intent may be ranked so that users who work at companies in the same geographic area as the querying user are ranked higher than users who work at geographically distant companies. In particular embodiments, the search results may scored or ranked by a particular scoring/ranking algorithm implemented by the search engine. As an example and not by way of limitation, search results that are more relevant to the search query or to the user may be scored higher than the resources that are less relevant. The way relevance is determined may be modified based on the search intent identified by social-networking system 160. In particular embodiments, social-networking system 160 may rank the one or more search results. Search results may be ranked, for example, based on the score determined for the search result. The most relevant result (e.g., highest/best scoring) may be ranked highest, with the remaining results having lower ranks commensurate with their score/relevance, such that the least relevant result is ranked lowest. Although this disclosure describes ranking search results based on search intent in a particular manner, this disclosure contemplates ranking search results based on search intent in any suitable manner.

In particular embodiments, social-networking system 160 may determine one or more search intents based on one or more of the selected nodes or selected edges referenced in a structured query. Particular social-graph elements may correspond to particular search intents. In particular embodiments, social-networking system 160 may determine the probability that a particular social-graph element corresponds to a particular search intent based social-graph information. As an example and not by way of limitation, when determining a probability, p, that a particular search intent is associated with a particular query, the calculation of the probability may also factor in social-graph information. Thus, the probability of corresponding to a particular search intent, I, given a particular social-graph element, X, and query, q, may be calculated as $p=(I|X,q)$. In particular embodiments, social-networking system 160 may identify one or more search intents that correspond to one or more of the nodes or one or more of the edges referenced in the structured query. Each search intent may correspond to one or more social-graph elements. Similarly, a particular social-graph element may correspond to one or more search intents. As an example and not by way of limitation, for the structured query "Single women in Palo Alto", social-networking system 160 may determine that the single-type edge 206 referenced in the structured query may correspond to an intent for dating, indicating that the querying user is interested in finding users for dating or socializing purposes. Similarly, the female-gender-type edge 206 referenced in the structured query may also corresponding to an intent for dating. In other words, because the querying user submitted a structured query referencing the social-graph elements corresponding to "single" and/or "women", social-networking system 160 may be able to determine that the querying user is attempting to find objects for dating purposes, and may then be able to subsequently score/rank search result appropriately based on this determined intent. As another example and not by way of limitation, for the structured query "People who work as software engineers in Palo Alto", social-networking system 160 may determine that the work-at-type edge 206 referenced in the structured query may correspond to an intent for networking, indicating that the querying user is interested in finding user for networking, recruiting, or employment purposes. Although this disclosure describes particular types of search intents, this disclosure contemplates any suitable types of search intents. In particular embodiments, social-networking system 160 may identify one or more search intents by referencing a pattern-detection model. As an example and not by way of limitation, social-networking system 160 may access a pattern-detection model that indexes particular social-graph elements that correspond to particular search intents. The index may indicate, for example, that particular nodes or node-types, or particular edges or edge-types, alone or in combination, correspond to particular search intents. Social-networking system 160 may then determine whether any of the nodes or edges referenced in the structured query match the nodes or edges indexed in the pattern-detection model. For each matching node or edge found in the index, social-networking system 160 may identify the search intent indexed in the pattern-detection model as corresponding to the matching node or matching edge referenced in the structured query. Although this disclosure describes determining particular search intents in a particular manner, this disclosure contemplates determining any suitable search intents in any suitable manner.

In particular embodiments, social-networking system 160 may determine one or more search intents based on user information from a user-profile page associated with the querying user. The querying user may be associated with a particular user node 202 of the social graph 200, and may also be associated with a particular user-profile page. Particular user information may correspond to particular search intents. As an example and not by way of limitation, where a querying user has indicated on his user-profile page that he is "single" in a relationship-status field (i.e. not in a relationship), social-networking system 160 may determine that this user-profile information corresponds to an intent for dating. Social-networking system 160 may then determine that particular structured queries from this querying user are more likely to be associated with a dating search intent. As another example and not by way of limitation, where a querying user has indicated on her user-profile page that she is "unemployed" in a work-history field, social-networking system 160 may determine that this user-profile information corresponds to an intent for networking. Social-networking system 160 may then determine that particular structured queries from this querying user are more likely to be associated with a networking intent. Although this disclosure describes determining search intents based on particular user information in a particular manner, this disclosure contemplates determining search intents based on any suitable user information in any suitable manner.

In particular embodiments, social-networking system 160 may determine one or more search intents based on one or more of query constraints of the query command generated in response to the structured query. In response to receiving a structure query from the querying user, social-networking system 160 may generate a query command based on the structured query, where the query command may comprise one or more query constraints. Particular query constraints may correspond to particular search intents. As an example and not by way of limitation, for the structured query "Single women in Palo Alto", social-networking system 160 may generate a query command such as, for example, (intersect(user_gender:<female>, user_location:<Palo Alto>, user_relationship_status:<single>)). Social-networking system 160 may then determine that the query constraint for (user_gender:<female>) corresponds to an intent for dating. Although this disclosure describes determining search intents based on particular query constraints in a particular manner, this disclosure contemplates determining search intents based on any suitable query constraints in any suitable manner.

In particular embodiments, social-networking system 160 may determine one or more search intents based a search history associated with the querying user. Search intents previously determined for the querying user may be more likely to match the search intent of the querying user's current search query. As an example and not by way of limitation, if querying user has previously run search queries that social-networking system 160 has determined correspond to a dating intent, when determining the probability that subsequent search queries corresponds to a particular search intent, social-networking system 160 may determine that the dating intent has a relatively higher probability of corresponding to the subsequent search query because the querying user has previously run search queries having that intent. As another example and not by way of limitation, if querying user has never run search queries that social-networking system 160 has determined correspond to a networking intent, when determining the probability that subsequent search queries corresponds to a particular search intent, social-networking system 160 may determine that the networking intent has a relatively lower probability of corresponding to the subsequent search query because the querying user has never run search queries having that intent. Although this disclosure describes determining search intents based on particular search history information in a particular manner, this disclosure contemplates determining search intents based on any suitable search history information in any suitable manner.

In particular embodiments, social-networking system 160 may determine one or more search intents based on one or more n-grams from the structured query. The n-gram may be any contiguous sequence of n items from the structured query, which may include character strings or social-graph references. Particular n-grams may correspond to particular search intents. Although this disclosure describes determining search intents based on particular query terms in a particular manner, this disclosure contemplates determining search intents based on any suitable query terms in any suitable manner.

In particular embodiments, social-networking system 160 may score the generated search results based on search intent. The search intent may indicate that the search results should be scored based on one or more factors, such as, for example, search counts or ratios, social-graph information, social-graph affinity, search history, other suitable factors, or any combination thereof. Search results may also be scored based on advertising sponsorship. Although this disclosure describes scoring search results in a particular manner, this disclosure contemplates scoring search results in any suitable manner.

In particular embodiments, social-networking system 160 may score the search results based on one or more search intents. Social-networking system 160 may score the search results using one or more scoring algorithms, where the search results may be scored based on their relevance to the search query. In some cases, a user may submit a search request for particular object-types, such as photos or users matching certain query constraints, but may desire more diversity in search results than simply the top N objects determined by a static ranking. Instead, the querying user may desire to see search results that reflect the user's search intent. The determination of relevance, and thus the scoring of the search results, may be modified or customized by the determined search intent for the query. Particular scoring algorithms may be used for particular search intents, and particular factors of a scoring algorithm may be weighted more or less for particular search intents. As an example and not by way of limitation, continuing with a prior example, in response to the structured query "People who work as software engineers in Palo Alto", social-networking system 160 may determine that one of the search intents of the query is for networking. When scoring the identified user nodes 202 matching this query, social-networking system 160 may typically score based on social-graph affinity and score first-degree connections of the querying user better than more distant connections. However, if a user is querying for networking purposes, the user may not care about the degree-of-connection between the querying user and the identified user nodes 202. More useful for networking purposes may be to identify users who, for example, have more experience working as a software engineer, or users who are connected to other users who are also software engineers (particularly other software engineers who also live in Palo Alto). Thus, when scoring the search results based on the networking search intent, social-networking system 160 may use a scoring algorithm that gives less weight to the user's distance in the social graph 200 and more weight to social-graph information related to the user's work history and relevant work-related connections. Although this disclosure describes scoring search results in a particular manner, this disclosure contemplates scoring search results in any suitable manner.

In particular embodiments, scoring the search results based on search intent may comprise scoring the search results based on a count or ratio of the objects of the search result that satisfy the query constraints of the search query. Based on the identified search intents for the search query, the count, the ratio, or any combination thereof may be used as a factor when scoring the search results. For particular query constraints, the constraint may be satisfied multiple times by a particular object. Although this disclosure describes scoring search results based on search intent in a particular manner, this disclosure contemplates scoring search results based on search intent in any suitable manner.

In particular embodiments, social-networking system 160 may score the search results based on a count of the objects of the search result that satisfy the query constraints of the search query. In certain cases, a particular object matching a query constraint may in fact have multiple attributes that satisfy the constraint. As an example and not by way of limitation, locations may have multiple check-ins by users, photos may have multiple users tagged in them, groups may have multiple users who are members, etc. In these types of cases, the count of how many times a particular query constraint is being satisfied may be considered when ranking the search results. As an example and not by way of limitation, in response to a structured query for "Photos of my friends", social-networking system 160 may generate the query command (photos_of(users:<friends>)), and may determine that a search intent of this query is to view group photos the user's friends. However, this query command may be satisfied, for example, by a photo that has only one friend of the querying user tagged in it, or may be satisfied multiple times by a photo that has multiple friends tagged in it. Consequently, when scoring identified concept nodes 204 corresponding to photos with the user's friends tagged in the photo, social-networking system 160 may score photos better based on the number of the user's friends that are tagged in the photo. Thus, a photo that only has one friend tagged in it (such as, for example, a user's profile picture), may be scored worse than a photo that has several of the user's friends tagged in it. As another example and not by way of limitation, in response to a structured query for "Photos of single women", social-networking system 160 may determine that a search intent of this query is to view individual photos of single women (i.e., photos where the only user in the photo is the single woman). However, this query command may be satisfied, for example, by a group photo of single women, or a photo having just one user tagged in it who is a single woman. Consequently, when scoring identified concept nodes 204 corresponding to photos with single women tagged in them, social-networking system 160 may score photos of single women standing alone better than photos of a group of single women (or photos of a single woman with one or more other users who are not single women). Furthermore, profile pictures of single women may be scored better than non-profile pictures of single women. Although this disclosure describes scoring search results based on search result counts in a particular manner, this disclosure contemplates scoring search results based on search result counts in any suitable manner.

In particular embodiments, social-networking system 160 may score the search results based on a ratio of the objects of the search result that satisfy the query constraints of the search query. As described previously, a particular object matching a query constraint may have multiple attributes that satisfy the constraint. But the same object may also have multiple attributes that do not satisfy the constraint. In these types of cases, the count of how many times a particular query constraint is being satisfied compared to how many time it is not being satisfied (i.e., a ratio) may be considered when ranking the search results. As an example and not by way of limitation, in response to a structured query for "Photos of my family", social-networking system 160 may generate the query command (photos_of(users:<family>)), and may determine that a search intent of this query is to view group photos showing the user's family and no one else. In other words, an ideal match would be a photo where the ratio of people tagged in the photo who satisfy the query constraint is as close to 1 as possible (i.e., only members of the user's family are tagged in the photo and no other users are tagged in the photos). However, this query command may be satisfied, for example, by a photo that has only one member of the user's family in it along with several other users, or a photo that has all members of the user's family and several other people tagged in it. Consequently, when scoring identified concept nodes 204 corresponding to photos with the user's family members tagged in the photo, social-networking system 160 may score photos better based on the ratio of users tagged in the photo that belong to the user's family (i.e., the concept node 204 corresponding to the photo is connected by tagged-in-type edges 206 to one or more user nodes 202 corresponding to users connected by family-type edges 206 to the querying user). Thus, a photo showing four of the user's family members posing with three other non-family members may be scored worse than a photo that only shows three of the user's family members (thus, a lower count) but where no other users are tagged in the photo (thus, a higher ratio). Although this disclosure describes scoring search results based on search result rations in a particular manner, this disclosure contemplates scoring search results based on search result rations in any suitable manner.

In particular embodiments, social-networking system may score the search results based on a count of objects of the search result that satisfy multiple query constraints of the search query. Where the search query has a plurality of query constraints, search results that include a single object that satisfies multiple query constraints may be undesirable. In certain cases, a particular object matching a query command with multiple query constraints may satisfy a plurality of the query constraints based on one or more attributes. In these types of cases, the count of how many objects/attributes are being used to satisfy these query constraints may be considered when ranking the search results. For certain queries, it is desirable to use different nodes or edges to satisfy each query constraint of a query command having a plurality of constrains. As an example and not by way of limitation, in response to the structured query "Restaurants liked by Mark and men", social-networking system 160 may parse the structured query as a query command such as, for example, (intersect(locations: <restaurants>), (intersect(locations (liked_by: <Mark>), locations(liked_by(user_gender: <male>))), and may determine that a search intent of this query is to identify restaurants liked by the user "Mark" and at least one other person who is also male. In this case, assume the user "Mark" is also a male. Social-networking system 160 may identify a first set of objects matching the first query constraint, which will be locations that are restaurants (i.e., concept nodes 204 corresponding to locations that are connected by location_type edges 206 to a concept node 204 corresponding to "Restaurants"). Next, social-networking system 160 may intersect these results with a second set of objects identified as matching the second query constraint (which itself has multiple constraints), which will be locations liked by both the user "Mark" and by male users. However, since the user "Mark" is also male, locations liked by "Mark" may also be identified in this second set of objects. In this case, since a restaurant where only the user "Mark" likes it may be in both the first and second sets of objects, it is possible for social-networking system 160 to generate a search result corresponding to a location where the only user who likes it is the user "Mark" (or "Mark" and only female users). But the querying user is unlikely to want to view search results corresponding to only restaurants liked by "Mark" (in which case, the querying user could have simply searched for "Restaurants liked by Mark"). The user is more likely trying to find restaurants liked by at least two users—"Mark" and at least one other user who is male. Thus, social-networking system 160 may count whether one or two like-type edges 206 are being used to satisfy the query command (i.e., whether a like-type edge 206 connected to just "Mark" is being used, or if at least two different like-type edges 206 are being used: one from "Mark" and one from another user"). Thus, a restaurant where only a single like-type edge 206 is being used to satisfy both query constraints may be scored worse than a restaurant where two different like-type edges 206 are being used to satisfy the constraints. Although this disclosure describes scoring search results based on query constraints intent in a particular manner, this disclosure contemplates scoring search results based on query constraints in any suitable manner.

In particular embodiments, social-networking system 160 may score the search results based on a social-graph affinity associated with the querying user (or the user node 202 of the querying user). Social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In particular embodiments, social-graph affinity may be used as a factor when scoring search results. As an example and not by way of limitation, in response to the structured query "Photos of my friends", social-networking system 160 may generate the query command (photos_of(users:<friends>)), and may determine that the search intent of this query is to view group photos showing the user's friends. When scoring identified concept nodes 204 corresponding to photos with the user's friends tagged in the photo, social-networking system 160 may score photos better based on the querying user's respective social-graph affinity (e.g., as measured by a affinity coefficient) of the user's tagged in the photo with respect to the querying user. Furthermore, photos showing more of the querying user's friends may be tagged higher than photos showing fewer of the user's friends, since having more friends tagged in the photo may increase the querying user's affinity with respect to that particular photo. Although this disclosure describes scoring search results based on affinity in a particular manner, this disclosure contemplates scoring search results based on affinity in any suitable manner. Furthermore, in connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632, 869, field 1 Oct. 2012, each of which is incorporated by reference.

In particular embodiments, scoring the search results based on search intent may comprise scoring the search results based on social-graph information, such as, for example, the degree of separation in the social graph 200, node-type and edge-type information, social-graph affinity, other suitable social-graph information, or any combination thereof. As an example and not by way of limitation, in response to the structured query "Single women in Palo Alto", social-networking system 160 may determine that one of the search intents of the query is for dating. When scoring the identified user nodes 202 matching this query, social-networking system 160 may score based on social-graph affinity and score first-degree connections of the querying user better than more distant connections. However, if a user is querying for dating purposes, the user may be unlikely to want to view first-degree connections (i.e., the user's friends). More useful for dating purposes may be to identify second-degree connections (i.e., friends-of-friends) who are single women. Thus, when scoring the search results based on the dating search intent, social-networking system 160 may use a scoring algorithm that scores second-degree connections better than first-degree connections. As another example and not by way of limitation, continuing with the prior example, when scoring the identified user nodes 202 matching the structured query "Single women in Palo Alto", social-networking system 160 may score users better based on the number of "likes" the profile picture of the user has, where users with popular profile pictures (i.e., the concept node 204 corresponding to the profile picture is connected to many user nodes 202 by like-type edges 206) may be considered more attractive candidates for dating. Although this disclosure describes scoring search results based on social-graph information in a particular manner, this disclosure contemplates scoring search results based on social-graph information in any suitable manner.

In particular embodiments, scoring the search results based on search intent may comprise scoring the search results to exclude converse search results. One or more of the search intents identified by social-networking system 160 may comprise an intent to exclude converse search results. In this case, scoring the search results may comprise downgrading the score of each search result corresponding to at least one of the selected nodes referenced in the structured query. In certain scenarios, a querying user is unlikely to want to view a search result that corresponds to a node referenced in the structured query the querying user just transmitted to social-networking system 160, notwithstanding the fact that the referenced node may in fact satisfy the constraints of the query. As an example and not by way of limitation, in response to the structured query "People in photos of me", social-networking system 160 may parse the structured query as a query command such as, for example, (users_tagged_in(photo_of(<me>)). Social-networking system 160 may then generate search results listing users of the online social network that are tagged in photos where the querying user is also tagged. In this case, the querying user is obviously a person that is tagged in photos of the querying user, but the querying user is unlike to want to view a search result corresponding to himself (in fact, because the querying user is tagged in every photo of himself, he may be the best match to this query). Thus, social-networking system 160 may determine that one of the search intents of the query is to exclude converse results, which are search result corresponding nodes referenced in the structured query. Continuing with the prior example, the converse result would be the search result corresponding the querying user. Thus, even though the querying user (or the user node 202 corresponding to the querying user) would be identified by the query command, when scoring the search results, the search result corresponding to the querying user could be downgraded so that it is excluded from the search result that are actually transmitted back to the querying user, or at least scored such that it is ranked lower then other results. Although this disclosure describes scoring particular search results in a particular manner, this disclosure contemplates scoring any suitable search results in any suitable manner.

In particular embodiments, scoring the search results based on search intent may comprise scoring the search results to exclude inner search results. One or more of the search intents identified by social-networking system 160 may comprise an intent to exclude inner search results. In this case, scoring the search results may comprise downgrading the score of each search result corresponding to at least one of the nodes of the first set of nodes identified as matching the inner constraint. In certain scenarios, a querying user is unlikely to want to view a search result that matches both the inner and outer query constraints. As an example and not by way of limitation, in response to the structured query "Friends of Facebook employees", social-networking system 160 may parse the structured query as a query command such as, for example, (friends_of(users_employed_by(<Facebook>))). Social-networking system 160 may identify a first set of objects matching the inner query constraint, which will be users that are Facebook employees (i.e., user nodes 202 connected by employed-by-type edges 206 to the concept node 204 for the company "Facebook"). Next, social-networking system 160 may identify a second set of objects matching the outer query constraint, which will be users who are friends of the first set of users (i.e., user nodes 202 connected by friend-type edges 206 to the user nodes 202 in the first set). In this case, many users who are friends of Facebook employees (the matches for the outer constraint) may also be Facebook employees (the matches for the inner constraint), but the querying user is unlikely to want to view search results corresponding to Facebook employees (in which case, the querying user could have just searched for "People who are Facebook employees"). The user is more likely trying to identify non-Facebook employees who are friends with Facebook employees. Thus, social-networking system 160 may determine that one of the search intents of the query is to exclude inner search results, which are search result matching to the inner query constraint. Continuing with the prior example, the inner search results would be search results corresponding to Facebook employees. Thus, even though many Facebook employees are friends of other Facebook employees, the scores for search results corresponding to Facebook employees may be downgraded so that they are excluded from the search results that are actually transmitted back to the querying user, or at least scored such that they are ranked lower than search results corresponding to non-employees of Facebook who are friends of Facebook employees. Although this disclosure describes scoring particular search results in a particular manner, this disclosure contemplates scoring any suitable search results in any suitable manner.

In particular embodiments, scoring the search results based on search intent may comprise scoring the search results to exclude duplicate search results. One or more of the search intents identified by social-networking system 160 may comprise an intent to exclude duplicate search results. In this case, scoring the search results may comprise downgrading the score of each search result corresponding to a node that matches both the first query constraint and the second query constraint. In certain scenarios, a querying user is unlikely to want to view a search result where the same attribute of the object is being used to satisfy two different constraints in a query command. As an example and not by way of limitation, in response to the structured query "Photos of Mark with Facebook employees," social-networking system 160 may parse the structured query as a query command such as, for example, (intersect(photos_of: <Mark>), photos_of(users_employed_by: <Facebook>)). In this case, assume the user "Mark" is also a Facebook employee. Social-networking system 160 may identify a first set of objects matching the first query constraint, which will be photos of the user "Mark" (i.e. concept nodes 204 corresponding to photos that are connected by tagged-in-type edges 206 to the user node 202 corresponding to the user "Mark"). Next, social-networking system 160 may intersect these results with a second set of objects identified as matching the second query constraint (which is a nested constraint), which will be photos of users that are Facebook employees. However, since the user "Mark" is also a Facebook employee, photos of "Mark" may also be identified in this second set. In this case, since a photo where only the user "Mark" is tagged to be in both the first and second sets of objects, it is possible for social-networking system 160 to generate a search result corresponding a photo where the only user tagged in the photo is the user "Mark". But the querying user is unlikely to want to view search results correspond to photos of only "Mark" (in which case, the querying user could have simply searched for "Photos of Mark"). The user is more likely trying to identify photos that include at least two users—"Mark" and at least one other user who is a Facebook employee. Thus, social-networking system 160 may determine that one of the search intents of the query is to exclude duplicate search results, which are search results where the same attribute of the search result is being used to satisfy two different query constraints. Continuing with the prior example, the first constraint would generate search result corresponding to photos Mark (who happens to be a Facebook employee in this example), and the second constraint would generate search result corresponding to photos Facebook employees. In other words, a concept node 204 corresponding to particular photo may satisfy both constraints by simply being connected to a single user node 202 corresponding to the user "Mark" by a tagged-in-type edge 206 because that user node 202 is connected by an employed-by-type edge 206 to the concept node for the company "Facebook". Thus, even though the user "Mark" is a Facebook employee, when scoring the search results, the search results corresponding to photos of just "Mark" (or even "Mark" with other non-employees of Facebook) may be downgraded so they are excluded from the search results that are transmitted back to the querying user, or at least scored such that they are ranked lower than search result corresponding to photos of the user "Mark" with at least one other user who is also a Facebook employee. Although this disclosure describes scoring particular search results in a particular manner, this disclosure contemplates scoring any suitable search results in any suitable manner.

In particular embodiments, social-networking system 160 may send one or more search results to the querying user. The search results may be sent to the user, for example, in the form of a list of links on the search-results webpage, each link being associated with a different webpage that contains some of the identified resources or content. In particular embodiments, each link in the search results may be in the form of a Uniform Resource Locator (URL) that specifies where the corresponding webpage is located and the mechanism for retrieving it. Social-networking system 160 may then send the search-results webpage to the web browser 132 on the user's client system 130. The user may then click on the URL links or otherwise select the content from the search-results webpage to access the content from social-networking system 160 or from an external system (such as, for example, third-party system 170), as appropriate. In particular embodiments, each search result may include link to a profile page and a description or summary of the profile page (or the node corresponding to that page). The search results may be presented and sent to the querying user as a search-results page. When generating the search results, social-networking system 160 may generate one or more snippets for each search result, where the snippets are contextual information about the target of the search result (i.e., contextual information about the social-graph entity, profile page, or other content corresponding to the particular search result). In particular embodiments, social-networking system 160 may only send search results having a score/rank over a particular threshold score/rank. As an example and not by way of limitation, social-networking system 160 may only send the top ten results back to the querying user in response to a particular search query. Although this disclosure describes sending particular search results in a particular manner, this disclosure contemplates sending any suitable search results in any suitable manner.

In particular embodiments, social-networking system 160 may generate the query command based on one or more search intents. The structure of a query command generated by social-networking system 160 may be modified based on these search intents, such that the way a query command is generated in response to one structured query may be different from the way a query command is formed in response to another structured query. Similarly, one or more query constraints of a query command may be based on these search intents. Thus, as an alterative to, or in addition to, scoring/ranking search results based on search intent, the way search results are identified by social-networking system 160 when executing a query command. As an example and not by way of limitation, intents to identify particular nodes or node-types, identify nodes using query hinting, identify nodes using inverse operators, exclude converse search results, exclude inner search results, exclude duplicate results, other suitable intents, or any combination thereof may be used when generating a query command (or a particular query constraint of the query command) in response to a structured query received by social-networking system 160. Although this disclosure describes generating query commands based on particular search intents in a particular manner, this disclosure contemplates generating query commands based on any suitable search intents in any suitable manner.

Figure 8:
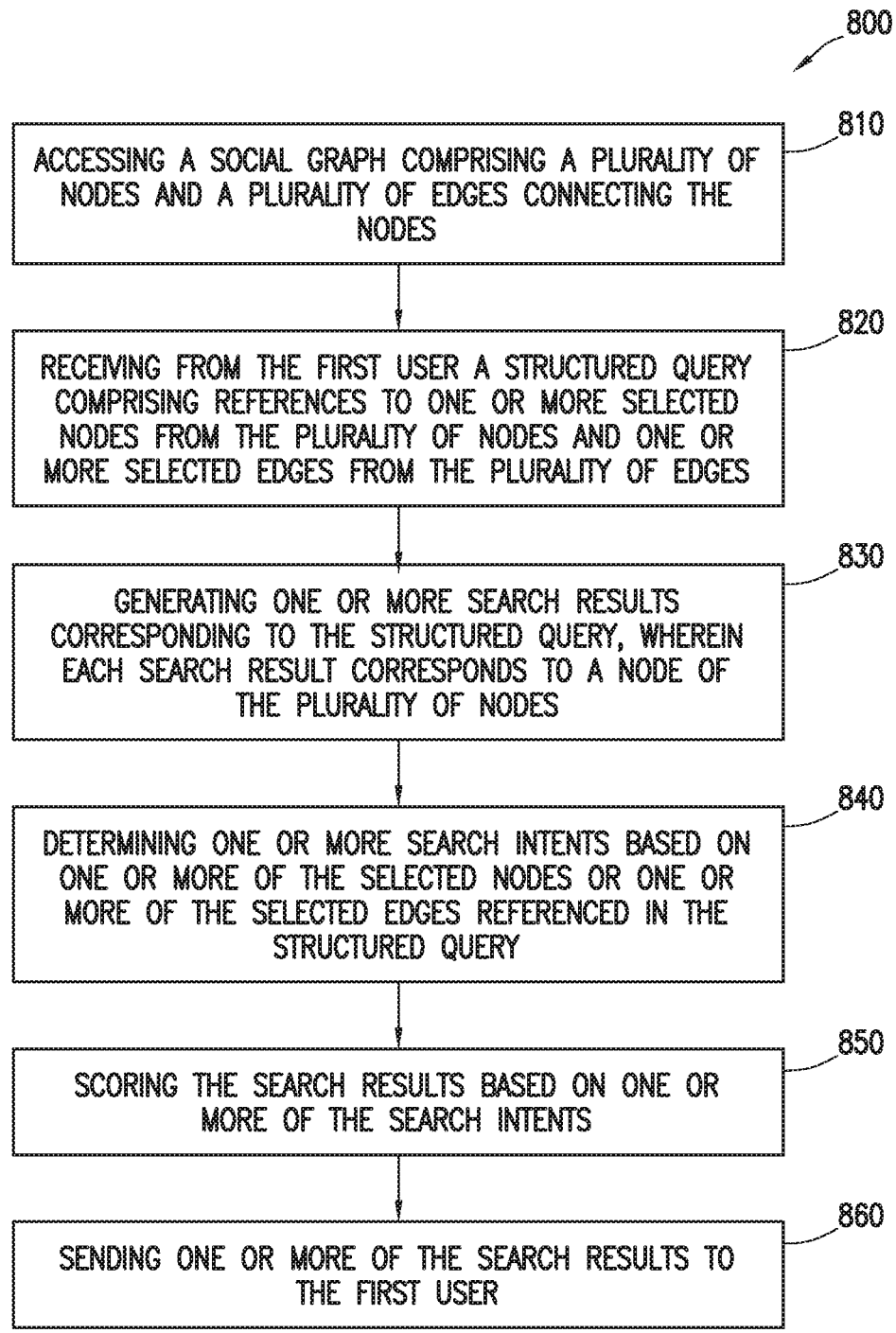
FIG. 8 illustrates an example method for generating search results based on search intent.

FIG. 8 illustrates an example method 800 for generating search results based on search intent. The method may begin at step 810, where social-networking system 160 may access a social graph 200 comprising a plurality of nodes (e.g., user nodes 202 or concept nodes 204) and a plurality of edges 206 connecting the nodes. Each edge between two nodes may represent a single degree of separation between them. The nodes may comprise a first node (e.g., a first user node 202) corresponding to a first user associated with the online social network. The nodes may also comprise a plurality of second nodes that each correspond to a concept or second user associate with the online social network. At step 820, social-networking system 160 may receive from the first user a structured query comprising references to one or more selected nodes from the plurality of nodes and one or more selected edges from the plurality of edges. At step 830, social-networking system 160 may generate one or more search results corresponding to the structured query. Each search result may correspond to a node of the plurality of nodes. At step 840, social-networking system 160 may determine one or more search intents based on one or more of the selected nodes or one or more of the selected edges referenced in the structured query. At step 850, social-networking system 160 may score the search results based on one or more of the search intents. At step 860, social-networking system 160 may send one or more of the search results to the first user. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

More information on generating search results may be found in U.S. patent application Ser. No. 13/731,939, filed 31 Dec. 2012, which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user). In addition or as an alternative, an advertisement may be one or more sponsored stories (e.g. a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes by, for example, having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content. As another example and not by way of limitation, advertisements may be included among suggested search query, where suggested queries that reference the advertiser or its content/products may be promoted over non-sponsored queries. In particular embodiments, the social-networking system 160 may select an advertisement to display to a user based on the search intent associated with a search query received from the user. Different advertisements (or types of advertisements) may be displayed to the user depending on the user's search intent.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may include social-networking-system functionality that a user may interact with. For example, an advertisement may enable a user to "like" or otherwise endorse the advertisement by selecting an icon or link associated with endorsement. As another example, an advertisement may enable a user to search (e.g., by executing a query) for content related to the advertiser. Similarly, a user may share the advertisement with another user (e.g. through social-networking system 160) or RSVP (e.g. through social-networking system 160) to an event associated with the advertisement. In addition or as an alternative, an advertisement may include social-networking-system context directed to the user. For example, an advertisement may display information about a friend of the user within social-networking system 160 who has taken an action associated with the subject matter of the advertisement.

Systems and Methods

Figure 9:
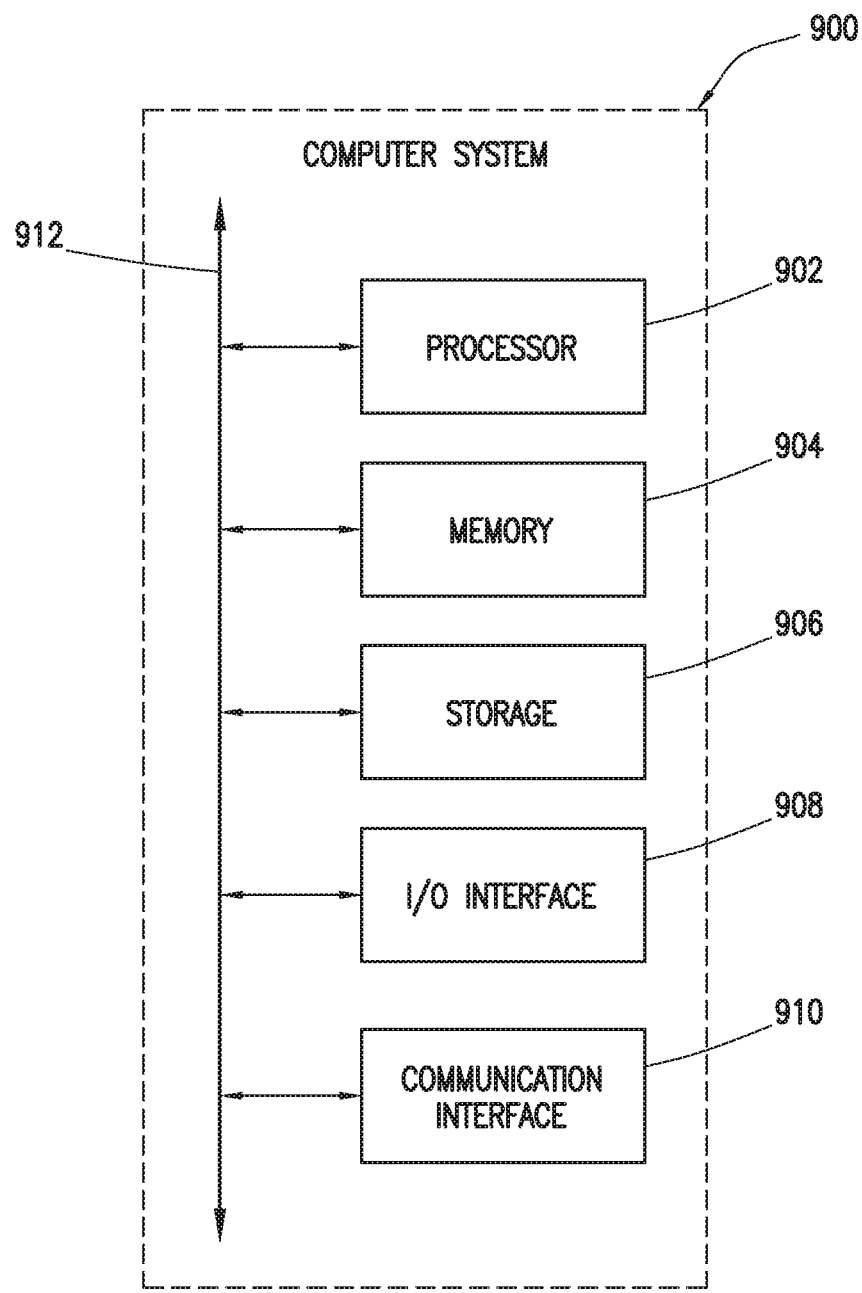
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving, from a client system of a first user, a query comprising one or more n-grams;
generating a plurality of query commands based on a parsing of the query input, wherein each query command comprises an inner query constraint and an outer query constraint;
scoring the plurality of query commands based at least in part on a number of objects matching the inner query constraint of the respective query command;
selecting, from the plurality of query commands, a first query command based at least in part on the respective scores of the query commands, wherein the first query command comprises a first inner query constraint and a first outer query constraint; and
executing the first query command to identify a plurality of objects, the plurality of objects being identified based on:
a first set of objects matching the first inner query constraint and at least in part matching the first outer query constraint; and
a second set of objects matching the first outer query constraint.

2. The method of claim 1, further comprising:
parsing the one or more n-grams of the query identify a plurality of query constraints, wherein the inner query constraint and the outer query constraint of each generated query command corresponds to one of the identified query constraints.

3. The method of claim 1, further comprising:
generating one or more search results based on the first and second sets of objects, wherein each search result corresponds to an object of the plurality of objects; and
sending, to the client system, one or more of the search results for display to the first user.

4. The method of claim 1, wherein the inner query constraint is for a first object-type and the outer query constraint is for a second object-type, and wherein the first object-type and the second object-type are each selected from a group consisting of: a user, a photo, a post, a webpage, an application, a location, and a user group.

5. The method of claim 1, further comprising:
scoring the first set of objects; and
scoring the second set of objects based at least in part on the scores of the first set of objects.

6. The method of claim 1, wherein executing the first query command to identify the plurality of objects comprises:
identifying a first number of objects matching at least the first inner query constraint; and
identifying a second number of objects matching both the first inner query constraint and the first outer query constraint.

7. The method of claim 1, wherein executing the first query command to identify the plurality of objects comprises:
identifying a first number of objects matching either the first inner query constraint or the first outer query constraint; and
identifying a second number of objects matching both the first inner query constraint and the first outer query constraint.

8. The method of claim 1, further comprising determining one or more search intents of the query based at least on whether one or more of the n-grams in the query match terms corresponding to a search intent indexed in a pattern-detection model.

9. The method of claim 8, further comprising scoring the plurality of query commands based on one or more of the search intents.

10. The method of claim 9, wherein the one or more search intents comprise an intent to exclude converse search results.

11. The method of claim 9, wherein the one or more search intents comprise an intent to exclude inner search results, and wherein scoring the plurality of query commands comprises downgrading the score of each query command that generates search results corresponding to objects matching the inner query constraint of the respective query command.

12. The method of claim 9, wherein the one or more search intents comprise an intent to exclude duplicate search results, and wherein scoring the plurality of query comprises downgrading the score of each query command that generates search results corresponding to objects that match both the inner query constraint and the outer query constraint of the respective query command.

13. The method of claim 8, wherein, for each query command, one or more of the inner query constraint or the outer query constraint is generated based on one or more of the search intents.

14. The method of claim 1, wherein the plurality of objects comprises to one or more objects of the second set of objects matching the first outer query constraint, each object of the plurality of objects corresponding to a second object that is related by a constraint of the first query command to at least one object of the first set of objects matching the first inner query constraint.

15. The method of claim 1, wherein the first inner query constraint is nested in the first outer query constraint.

16. The method of claim 1, wherein the query is a structured query comprising references to one or more selected objects accessible by the computing device.

17. The method of claim 1, wherein the query is a text string.

18. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to the first user; and
a plurality of second nodes corresponding to the plurality of objects, respectively.

19. One or more computer-readable non-transitory storage media embodying software that is operable when executed to:
receive, from a client system of a first user, a query comprising one or more n-grams;
generate a plurality of query commands based on a parsing of the query input, wherein each query command comprises an inner query constraint and an outer query constraint;
score the plurality of query commands based at least in part on a number of objects matching the inner query constraint of the respective query command;
select, from the plurality of query commands, a first query command based at least in part on the respective scores of the query commands, wherein the first query command comprises a first inner query constraint and a first outer query constraint; and
execute the first query command to identify a plurality of objects, the plurality of objects being identified based on:
a first set of objects matching the first inner query constraint and at least in part matching the first outer query constraint; and
a second set of objects matching the first outer query constraint.

20. A system comprising: one or more processors; and a memory coupled to the processors comprising instructions executable by the processors, the processors operable when executing the instructions to:
receive, from a client system of a first user, a query comprising one or more n-grams;
generate a plurality of query commands based on a parsing of the query input, wherein each query command comprises an inner query constraint and an outer query constraint;
score the plurality of query commands based at least in part on a number of objects matching the inner query constraint of the respective query command;
select, from the plurality of query commands, a first query command based at least in part on the respective scores of the query commands, wherein the first query command comprises a first inner query constraint and a first outer query constraint; and
execute the first query command to identify a plurality of objects, the plurality of objects being identified based on:
a first set of objects matching the first inner query constraint and at least in part matching the first outer query constraint; and
a second set of objects matching the first outer query constraint.

* * * * *